US011892244B2

(12) United States Patent
Ishino et al.

(10) Patent No.: US 11,892,244 B2
(45) Date of Patent: Feb. 6, 2024

(54) HEAT STORAGE MATERIAL UNIT, AND AUTOMATIC VENDING MACHINE EQUIPPED WITH SAID HEAT STORAGE MATERIAL UNIT

(71) Applicant: THE COCA-COLA COMPANY, Atlanta, GA (US)

(72) Inventors: Yuji Ishino, Kanagawa (JP); Yiguang Zhang, Kanagawa (JP); Yasuo Nakazato, Tokyo (JP); Yasuhiro Yamazaki, Tokyo (JP); Takashi Nishiyama, Tokyo (JP)

(73) Assignee: THE COCA-COLA COMPANY, Atlanta, GA (US)

( * ) Notice: Subject to any disclaimer, the term of this patent is extended or adjusted under 35 U.S.C. 154(b) by 441 days.

(21) Appl. No.: 17/255,301

(22) PCT Filed: Jun. 24, 2019

(86) PCT No.: PCT/JP2019/025004
§ 371 (c)(1),
(2) Date: Dec. 22, 2020

(87) PCT Pub. No.: WO2020/004346
PCT Pub. Date: Jan. 2, 2020

(65) Prior Publication Data
US 2021/0270541 A1 Sep. 2, 2021

(30) Foreign Application Priority Data
Jun. 26, 2018 (JP) ................................ 2018-121606

(51) Int. Cl.
*G07F 11/46* (2006.01)
*F28D 20/02* (2006.01)
(Continued)

(52) U.S. Cl.
CPC ............ *F28D 20/021* (2013.01); *F25D 11/00* (2013.01); *F25D 17/08* (2013.01); *F25D 23/066* (2013.01);
(Continued)

(58) Field of Classification Search
None
See application file for complete search history.

(56) References Cited

U.S. PATENT DOCUMENTS 8,091,374 B2 * 1/2012 Chang ....................... F25C 5/20 62/344
11,443,583 B2 * 9/2022 Fukuda ................... G07F 11/24
2017/0368530 A1 * 12/2017 Sato ......................... B01J 20/04

FOREIGN PATENT DOCUMENTS

JP H01124868 U 9/1989
JP H04267498 A 9/1992
(Continued)

OTHER PUBLICATIONS

International Search Report and Written Opinion, PCT/JP2019/025004, dated Sep. 3, 2019 (10 pp.).
(Continued)

*Primary Examiner* — Gene O Crawford
*Assistant Examiner* — Ayodeji T Ojofeitimi
(74) *Attorney, Agent, or Firm* — Eversheds Sutherland (US) LLP

(57) ABSTRACT

In order to improve the efficiency of solidification and melting of a heat storage material in a heat storage material unit, a heat storage material covered with a coating material is accommodated in a metal accommodating container having a high thermal conductivity, and the heat storage material unit is embedded in a thermal insulation panel in such a way that the accommodating container is exposed inside a merchandise accommodating compartment, thereby
(Continued)

enabling a surface of the heat storage material that is embedded in the thermal insulation panel also to exhibit an action equivalent to that if the accommodating container is exposed in the merchandise accommodating compartment as a heat transfer element, thereby improving the efficiency of solidification (heat storage) and melting (heat dissipation) of the heat storage material.

8 Claims, 17 Drawing Sheets

(51) Int. Cl.

| | |
|---|---|
| ***F25D 11/00*** | (2006.01) |
| ***F25D 17/08*** | (2006.01) |
| ***F25D 23/06*** | (2006.01) |
| ***G07F 9/10*** | (2006.01) |
| *F28D 20/00* | (2006.01) |

(52) U.S. Cl.
CPC .............. *G07F 9/105* (2013.01); *G07F 11/46* (2013.01); *F28D 2020/0026* (2013.01)

(56) References Cited

FOREIGN PATENT DOCUMENTS

| | | | |
|---|---|---|---|
| JP | H04291491 | A | 10/1992 |
| JP | 5-296642 | A | 11/1993 |
| JP | H05296642 | A | 11/1993 |
| JP | H10283556 | A | 10/1998 |
| JP | 2000357267 | A | 12/2000 |
| JP | 2002206844 | A | 7/2002 |
| WO | 2013176169 | A1 | 11/2013 |

OTHER PUBLICATIONS

Extended EP Search Report, EP19826075.4, dated Feb. 28, 2022 (7 pp.).

* cited by examiner

[Figure 1]
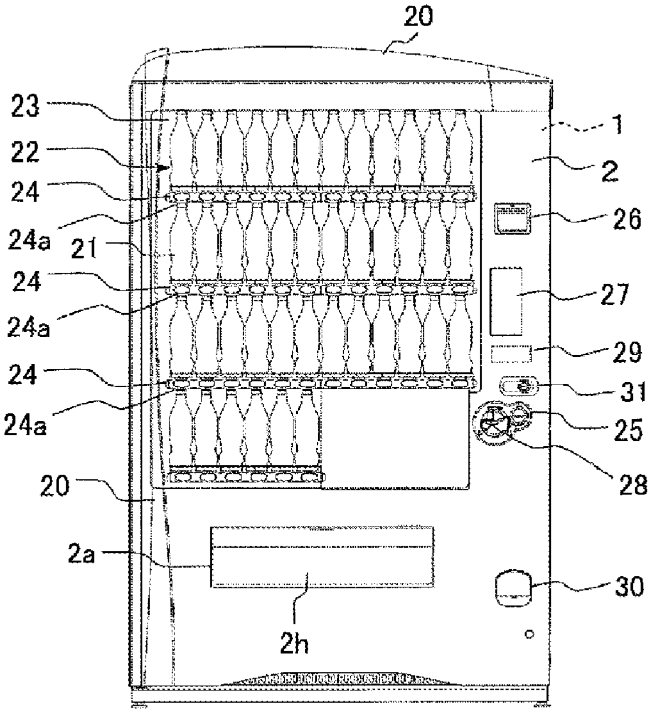
[Figure 2]
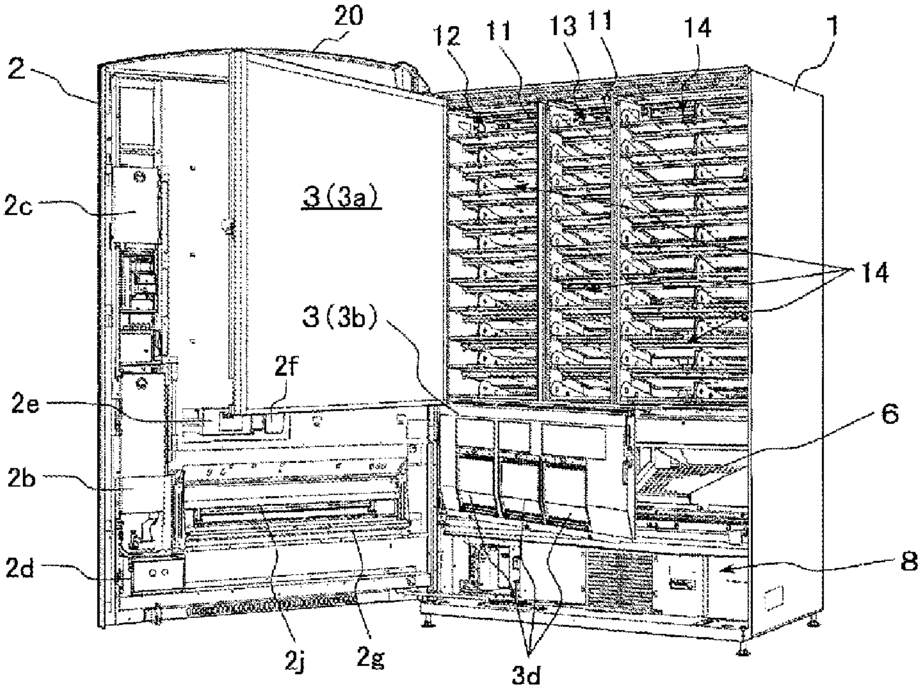

[Figure 3]
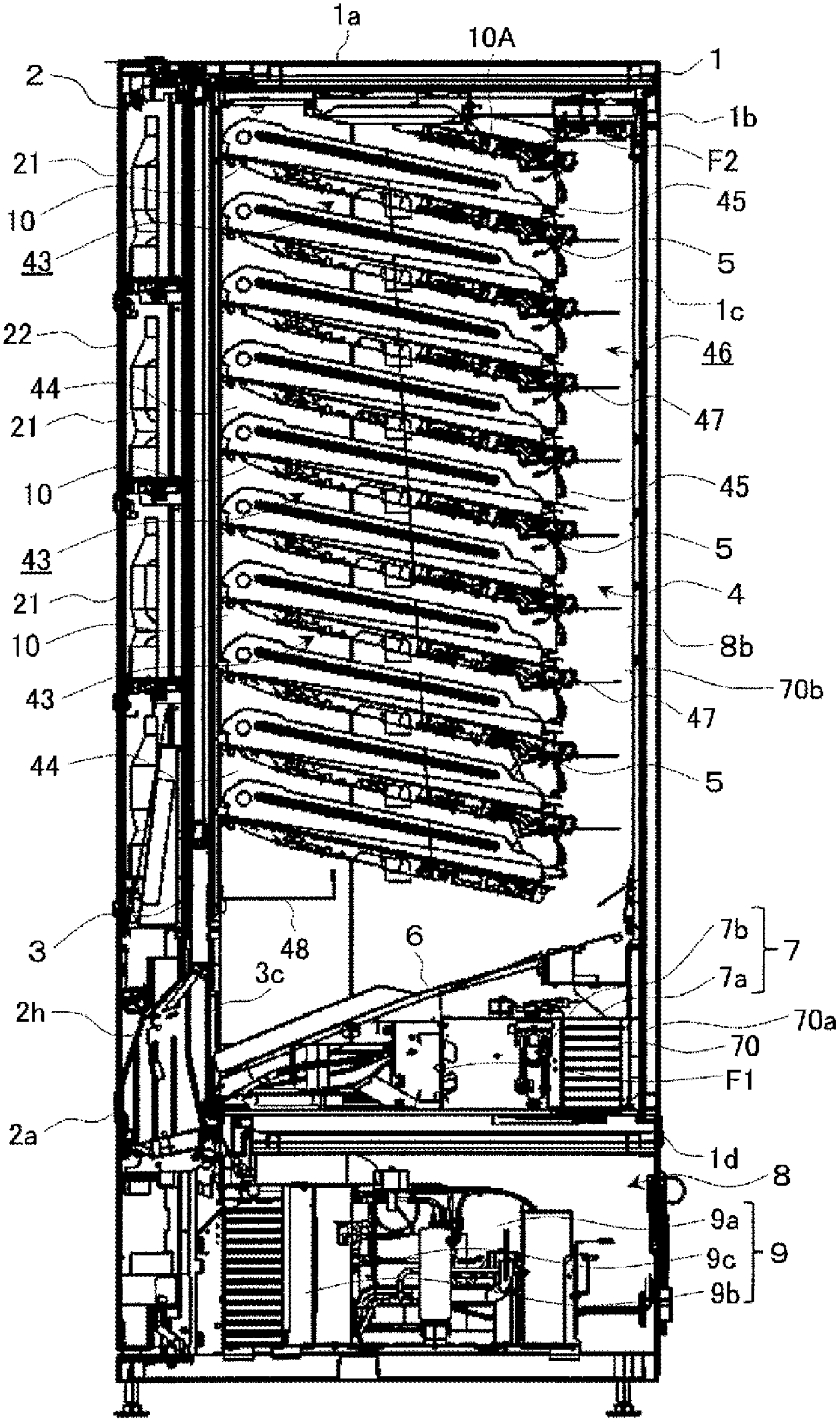

[Figure 4]
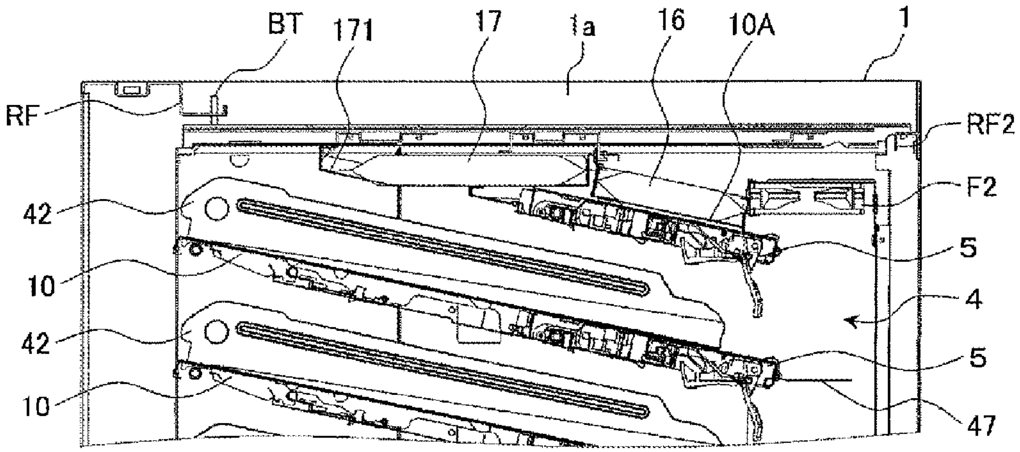

[Figure 5]
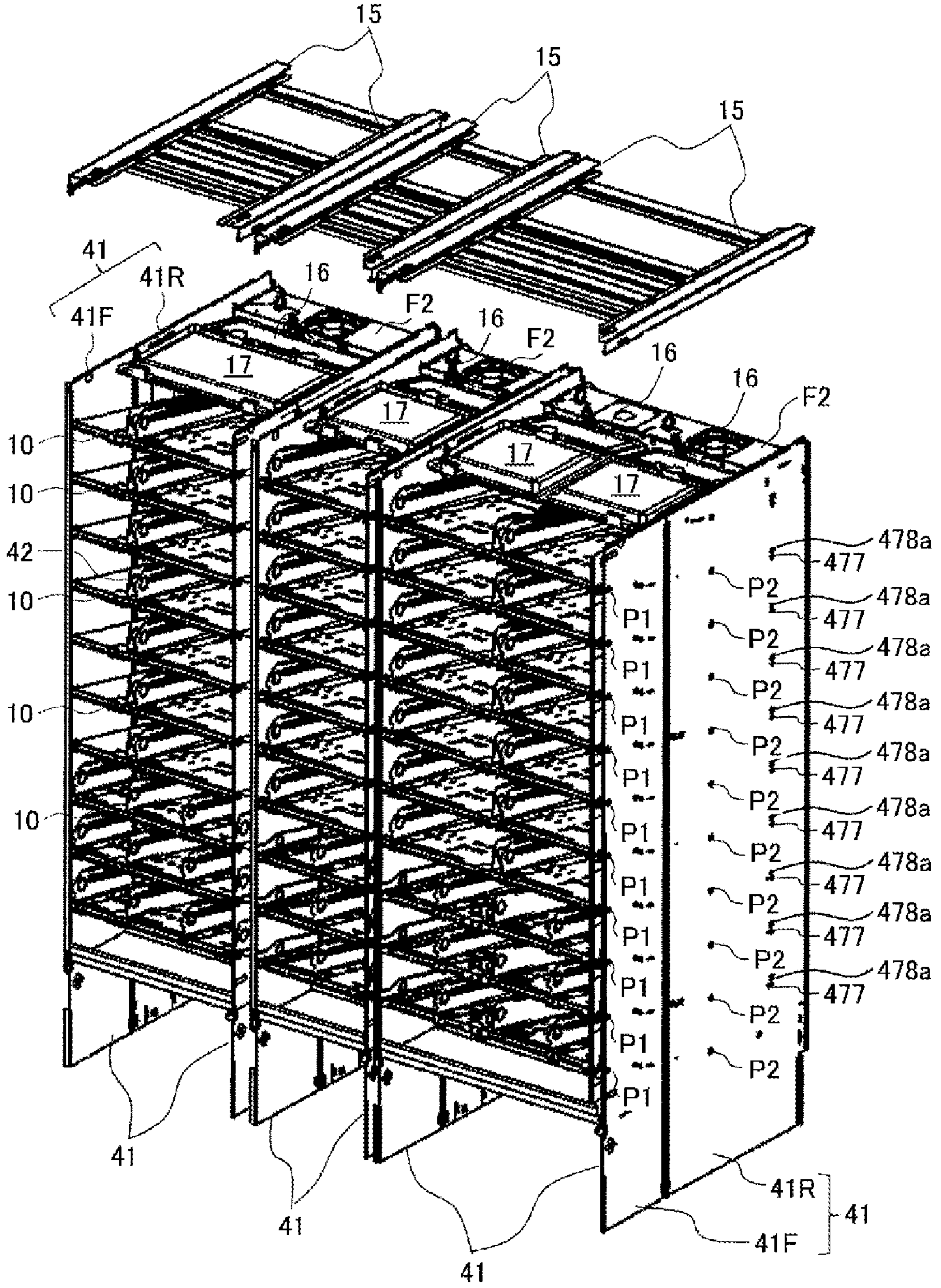

[Figure 6]
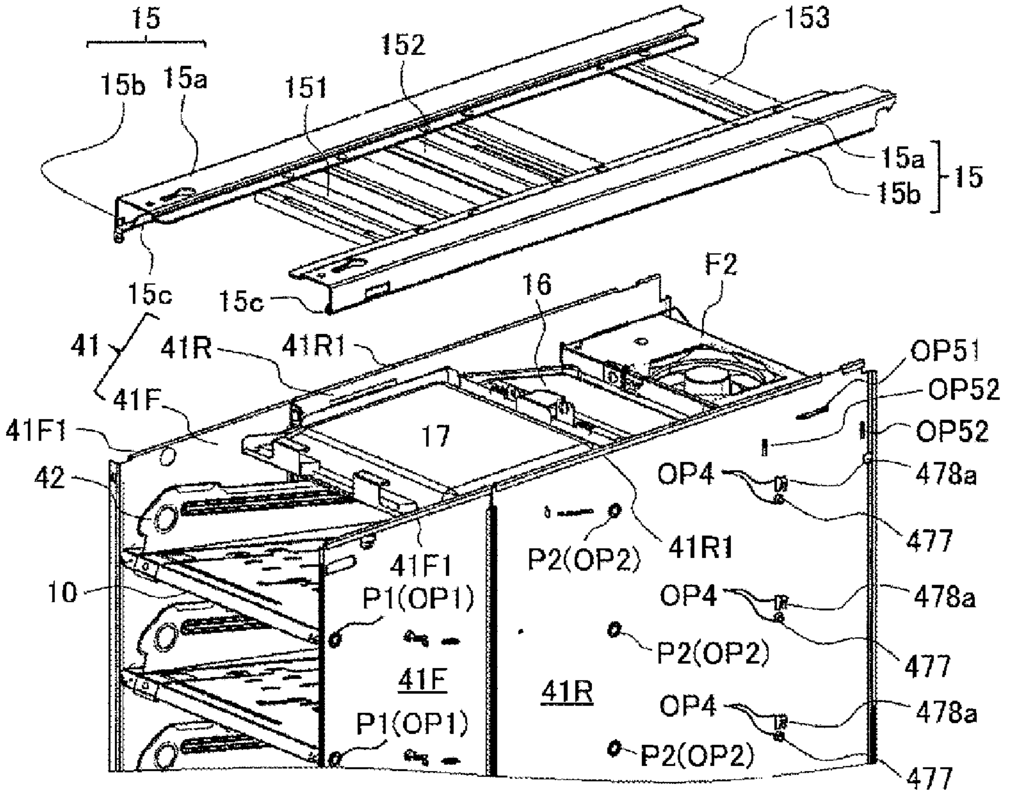
(a)
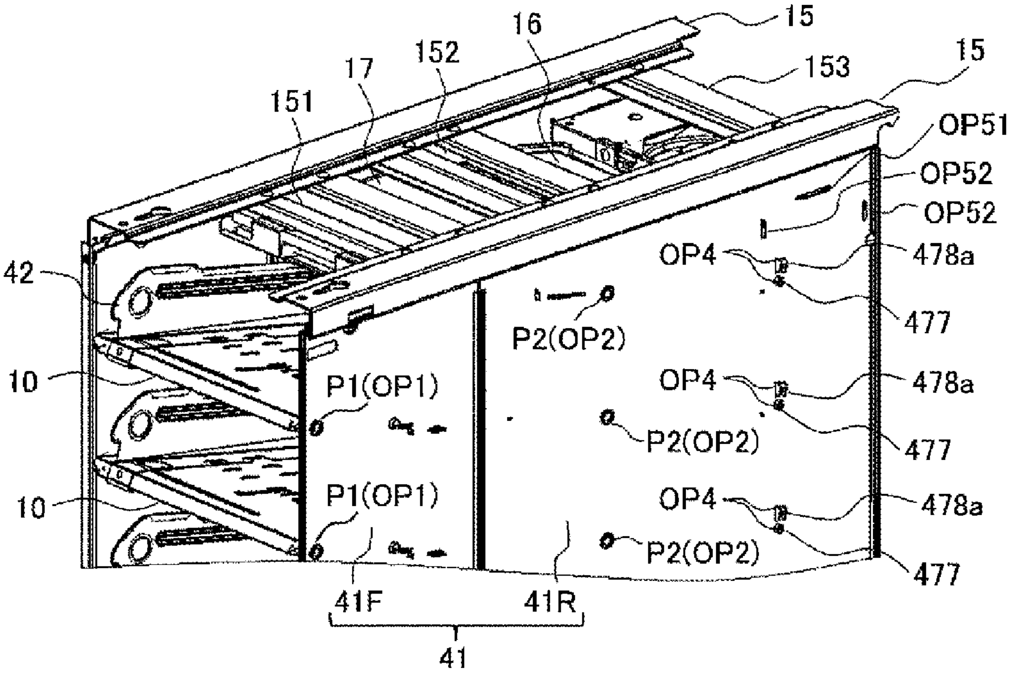
(b)

[Figure 7]
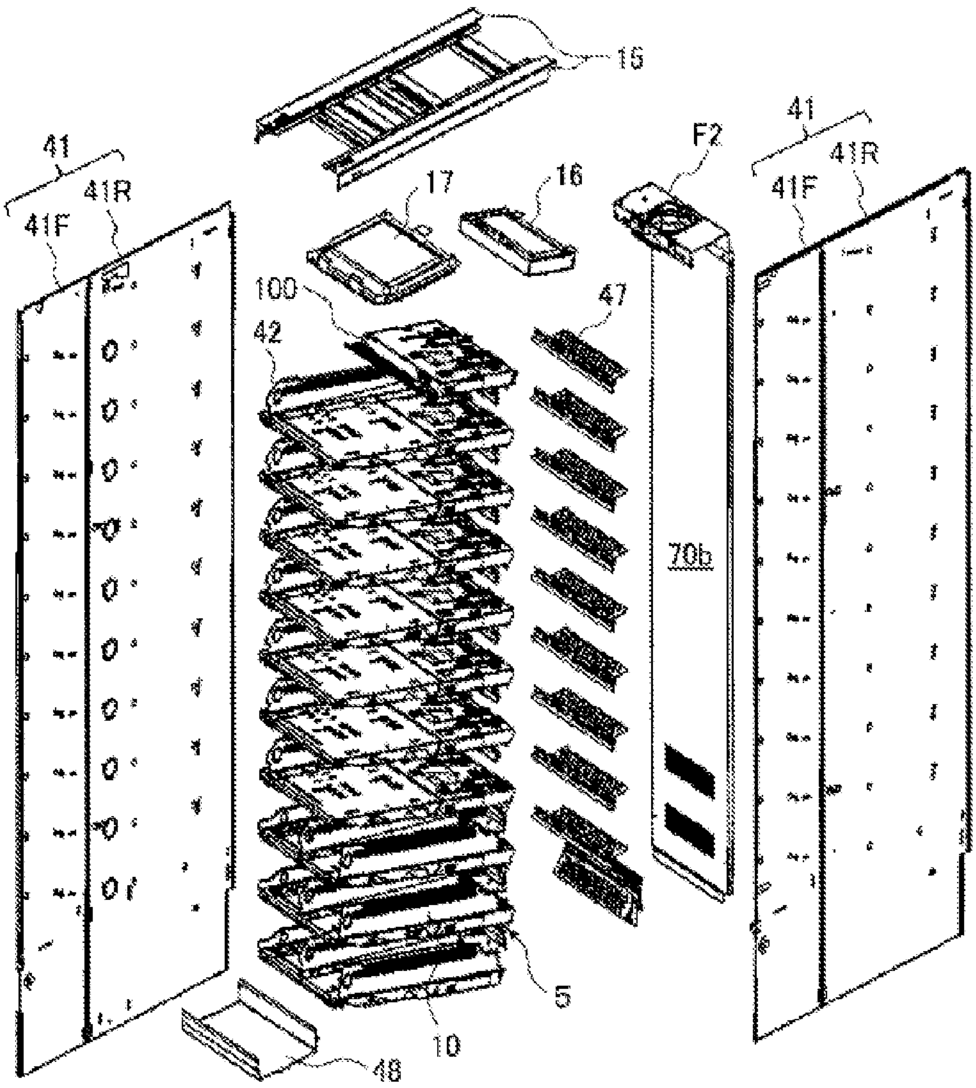

[Figure 8]
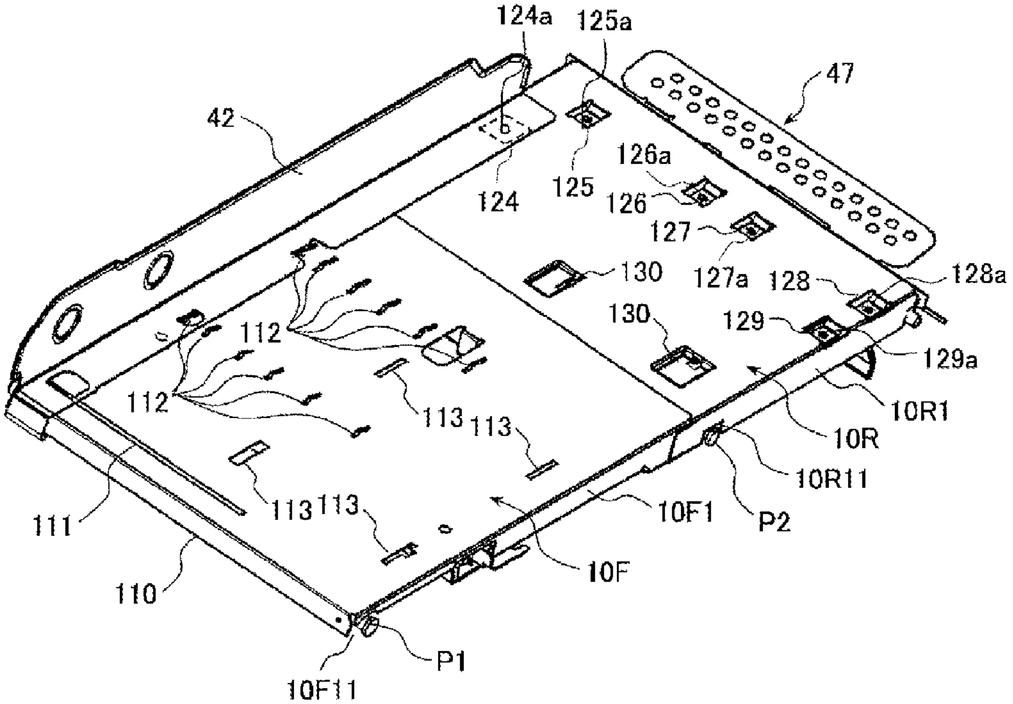
(a)
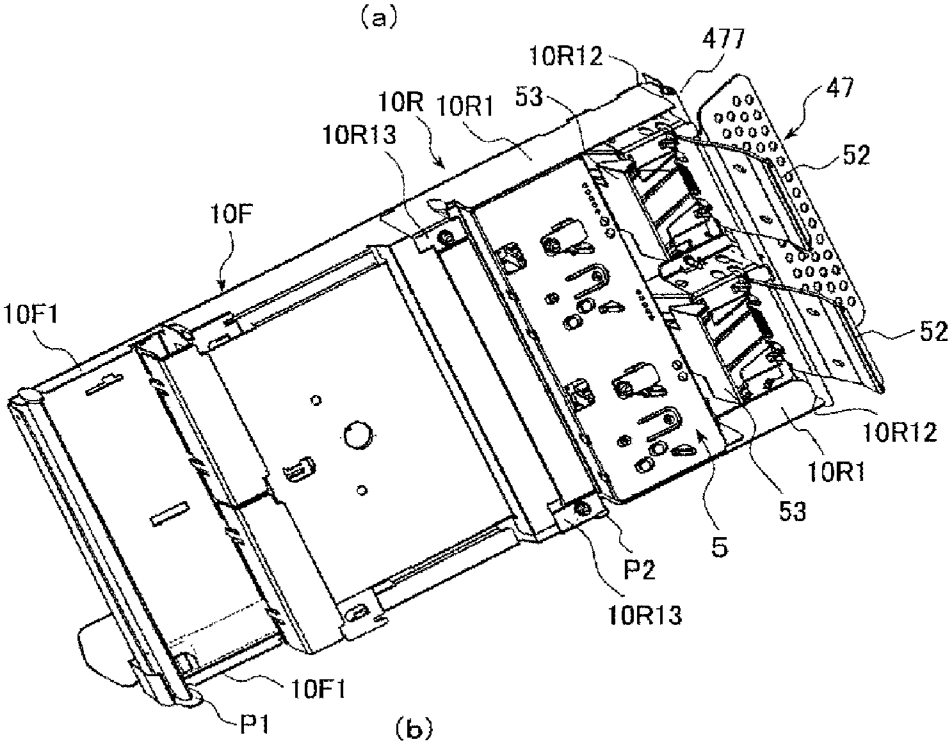
(b)

[Figure 9]
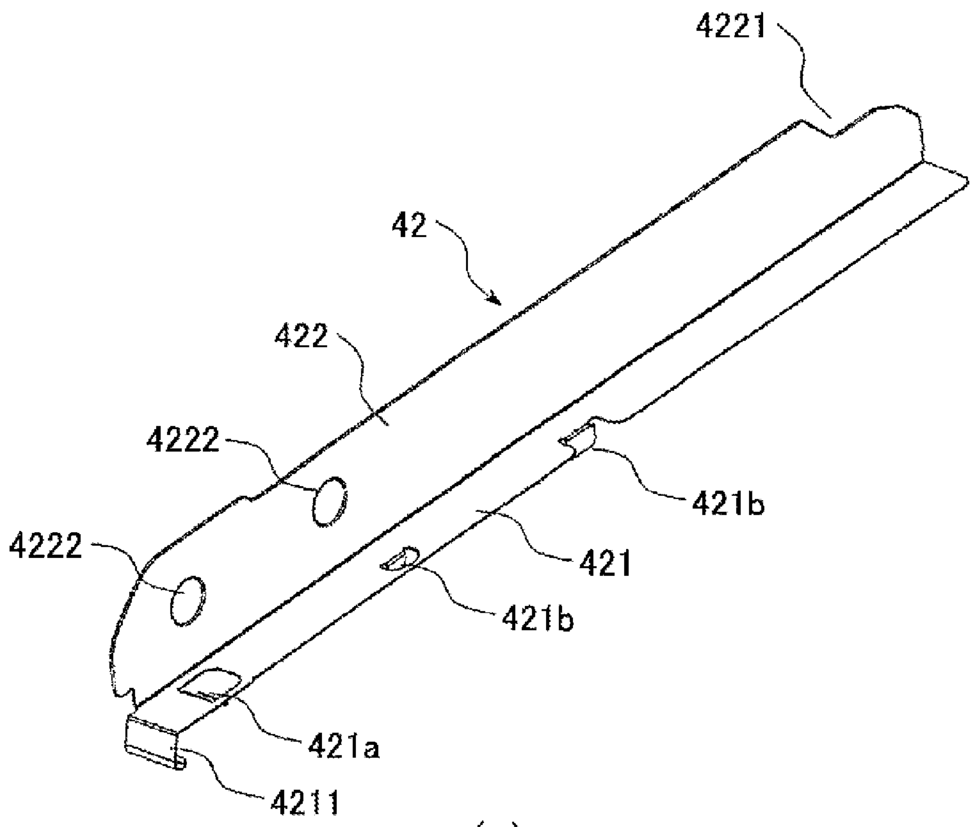
(a)
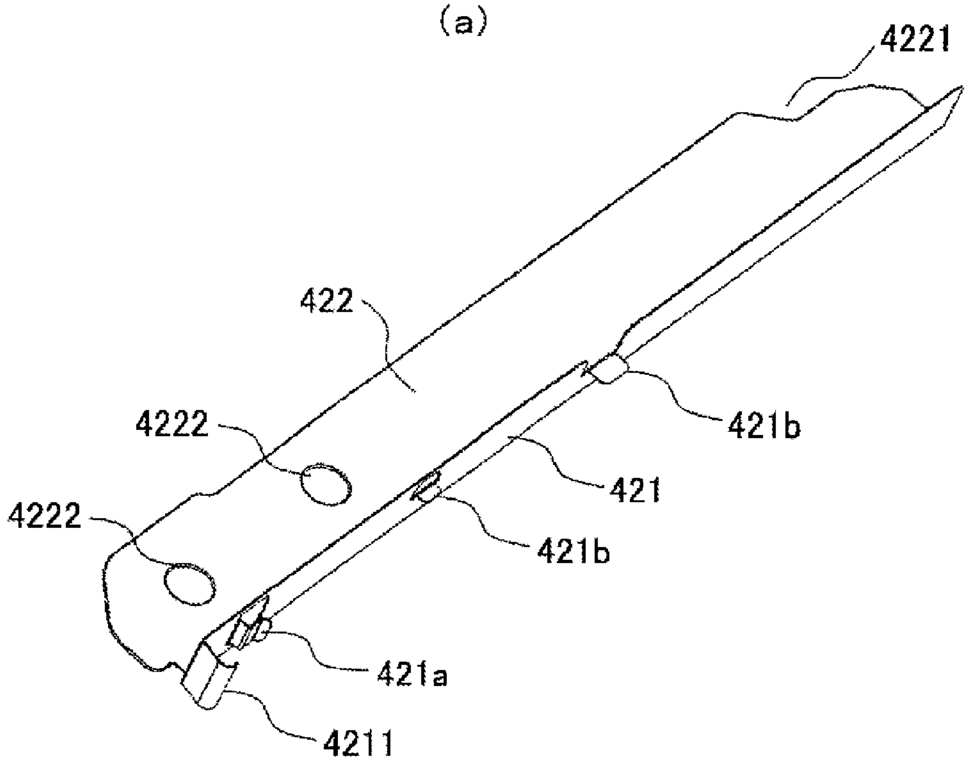
(b)

[Figure 10]
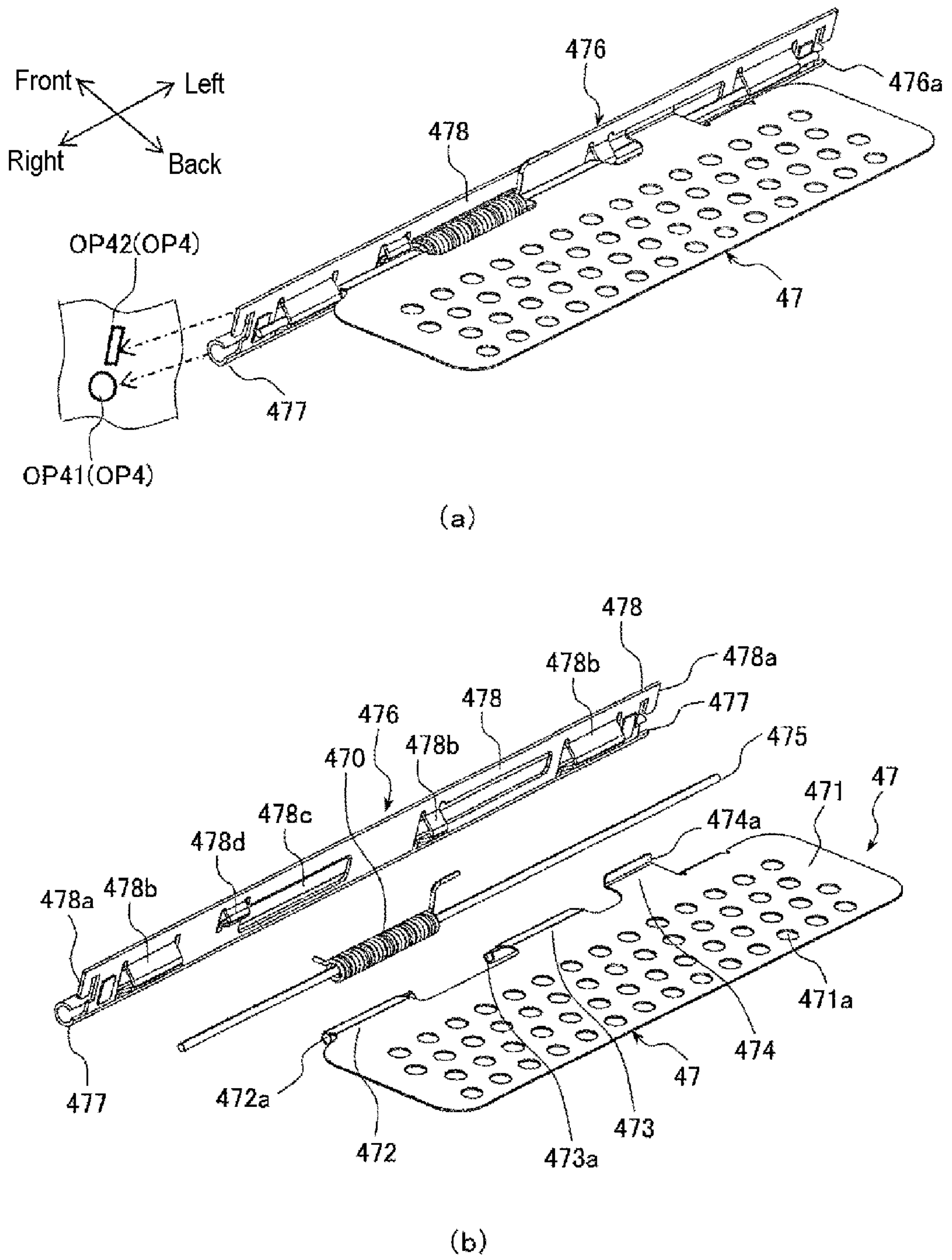

[Figure 11]
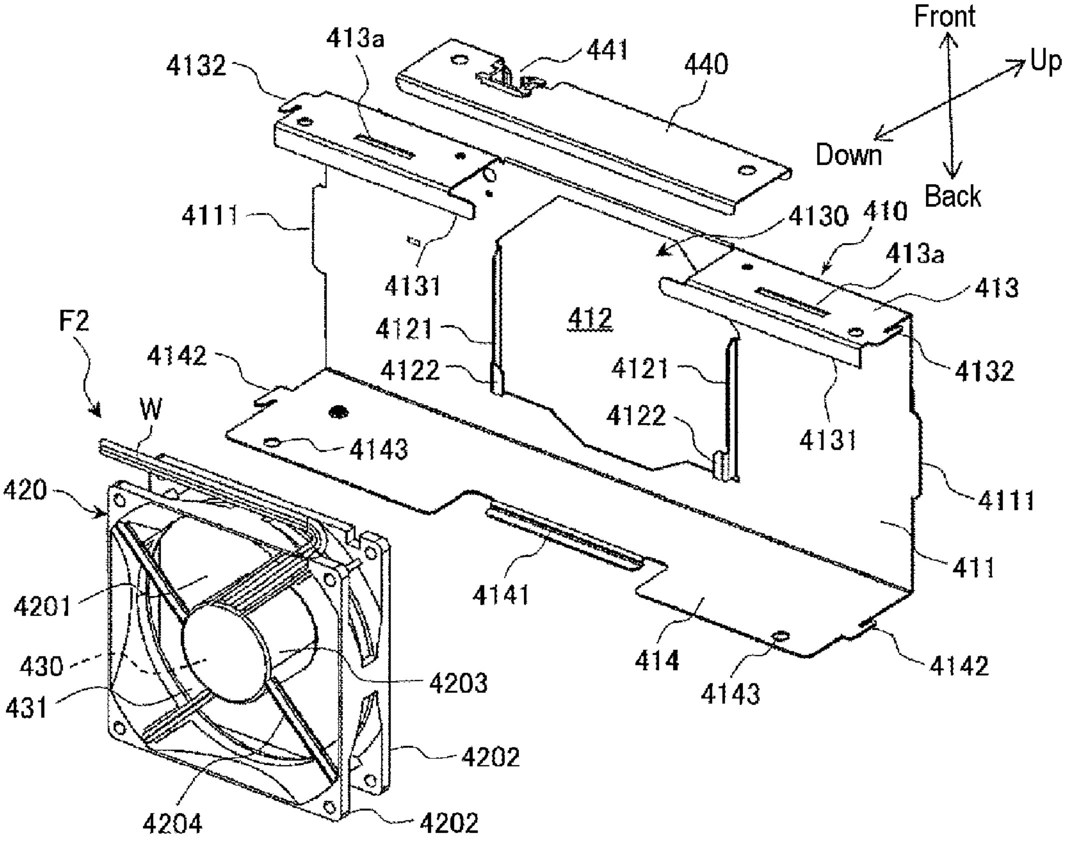
(a)
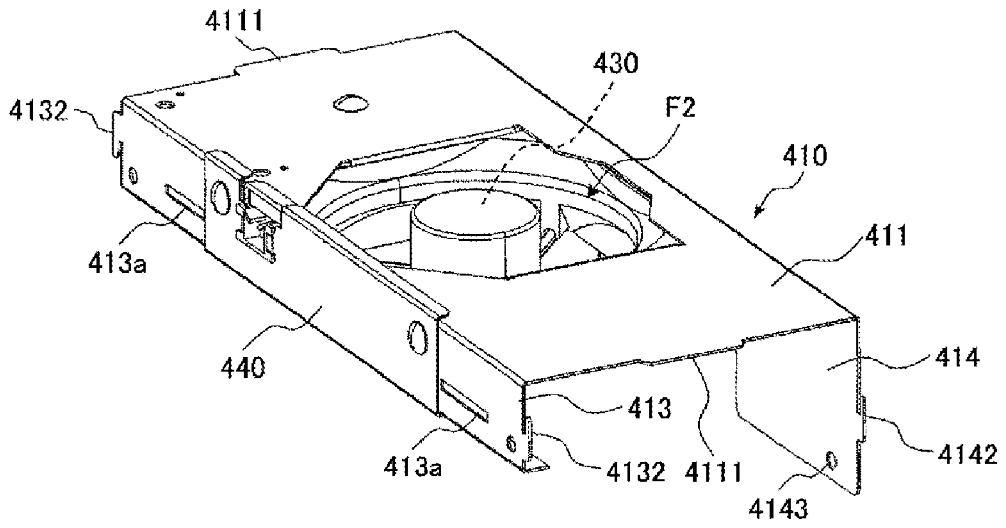
(b)

[Figure 12]
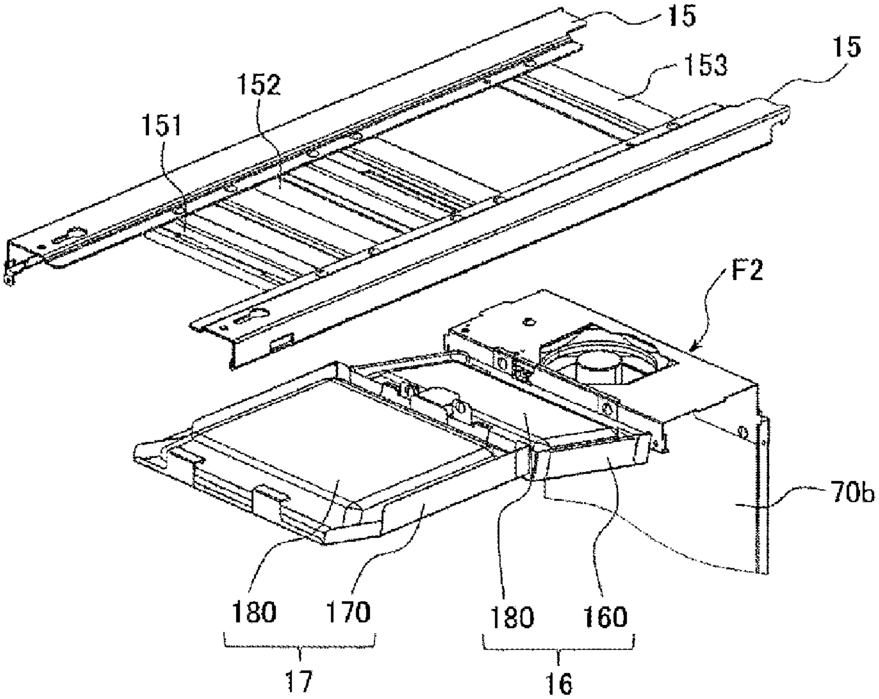
(a)
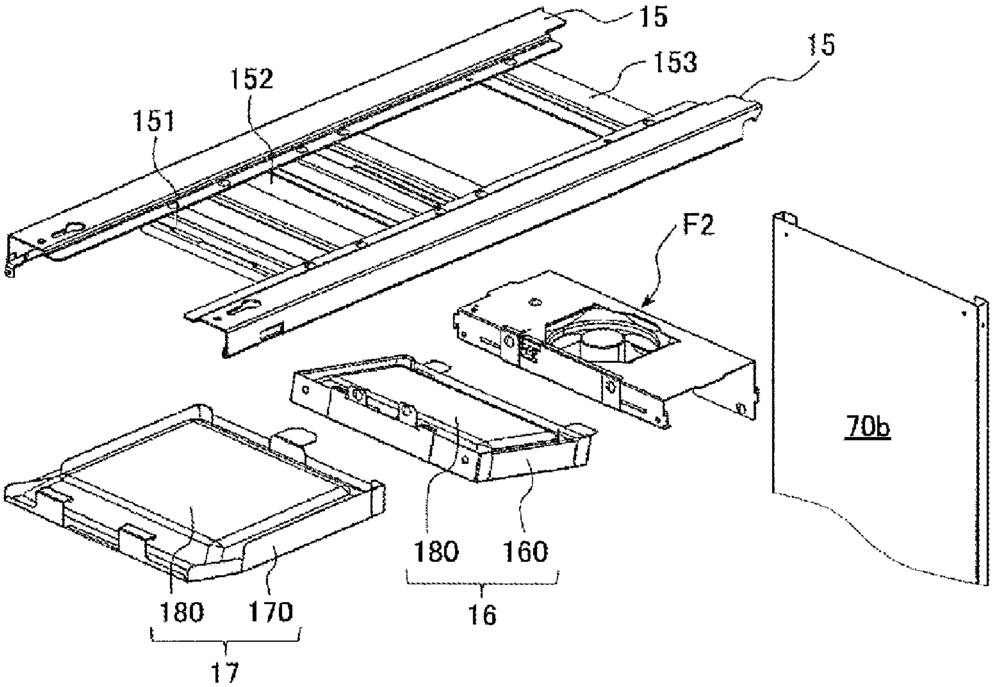
(b)

[Figure 13]
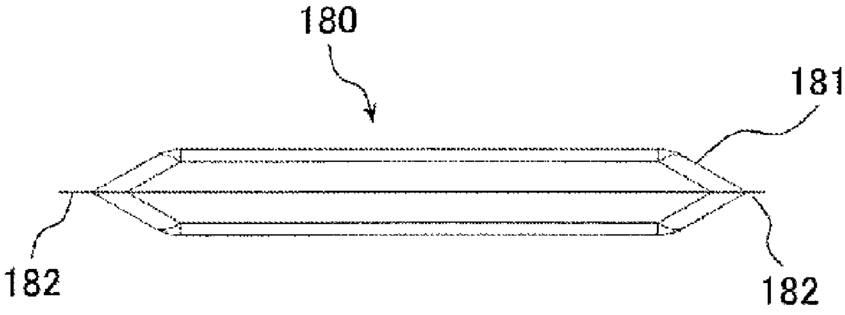
(a)
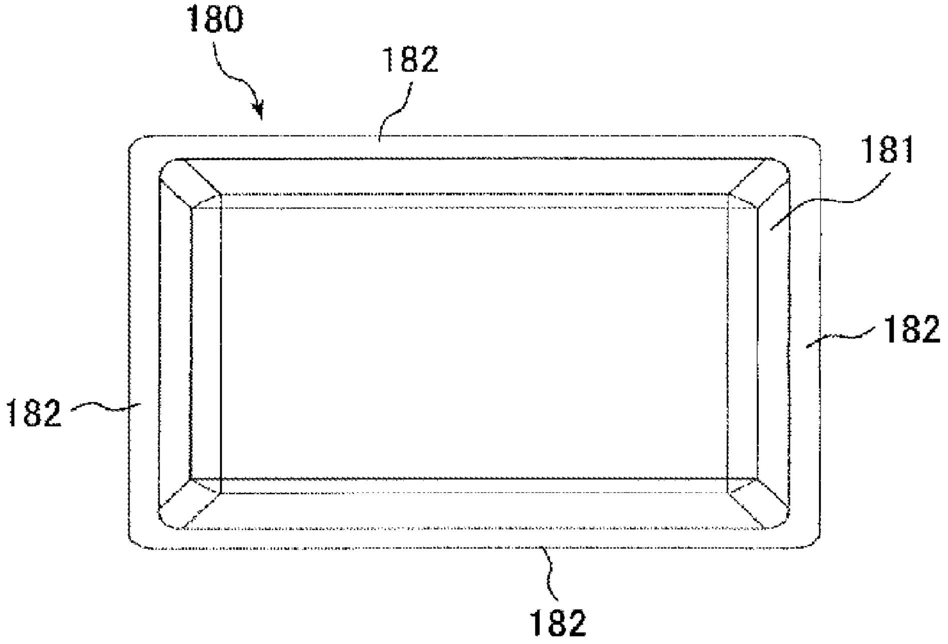
(b)

[Figure 14]
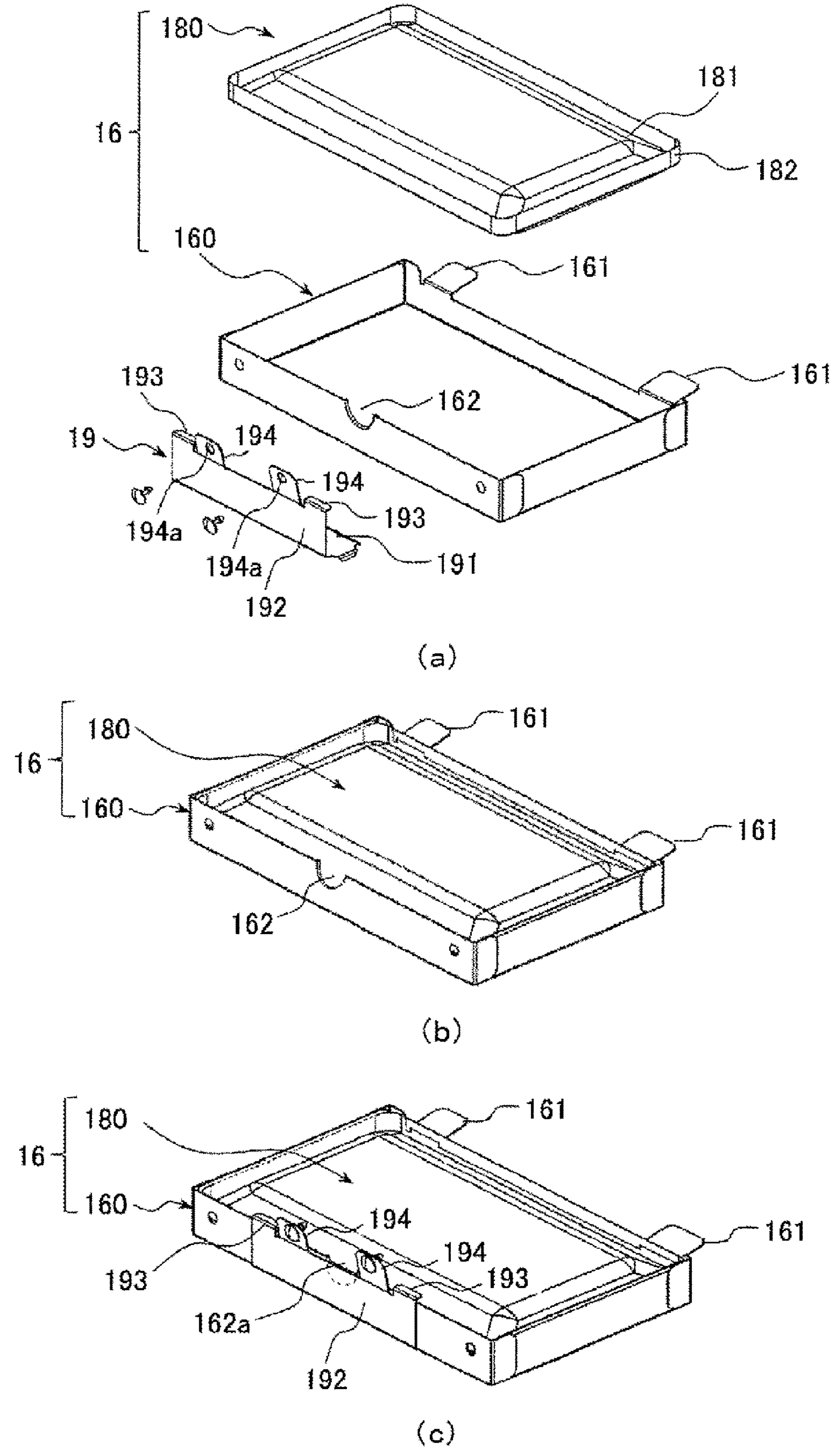

[Figure 15]
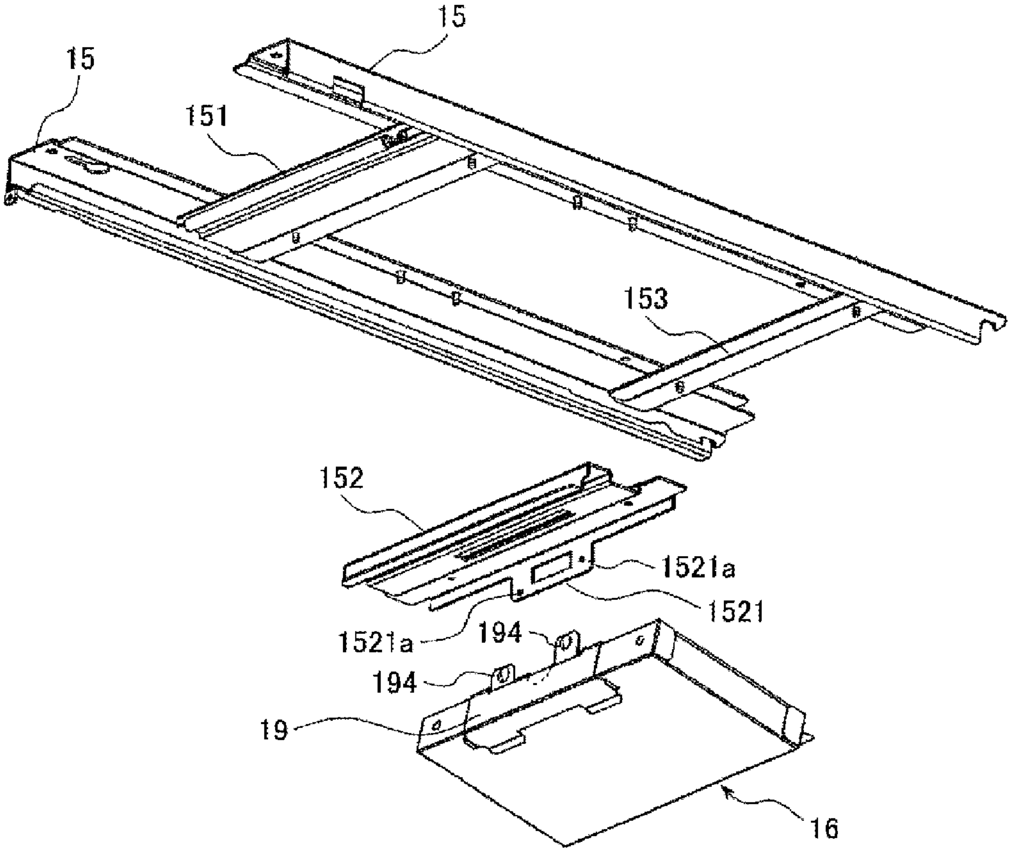

[Figure 16]
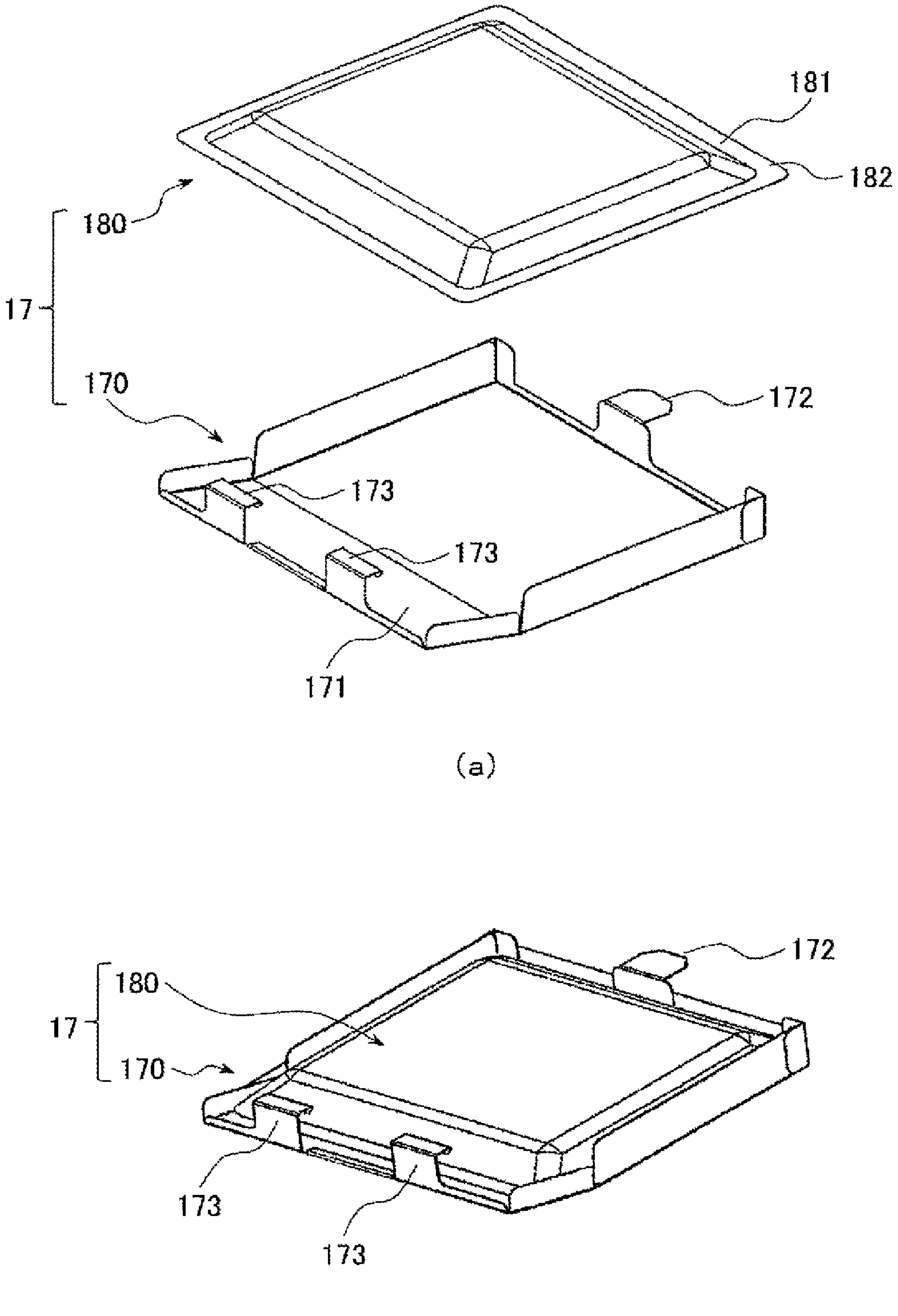
(a)
(b)

[Figure 17]
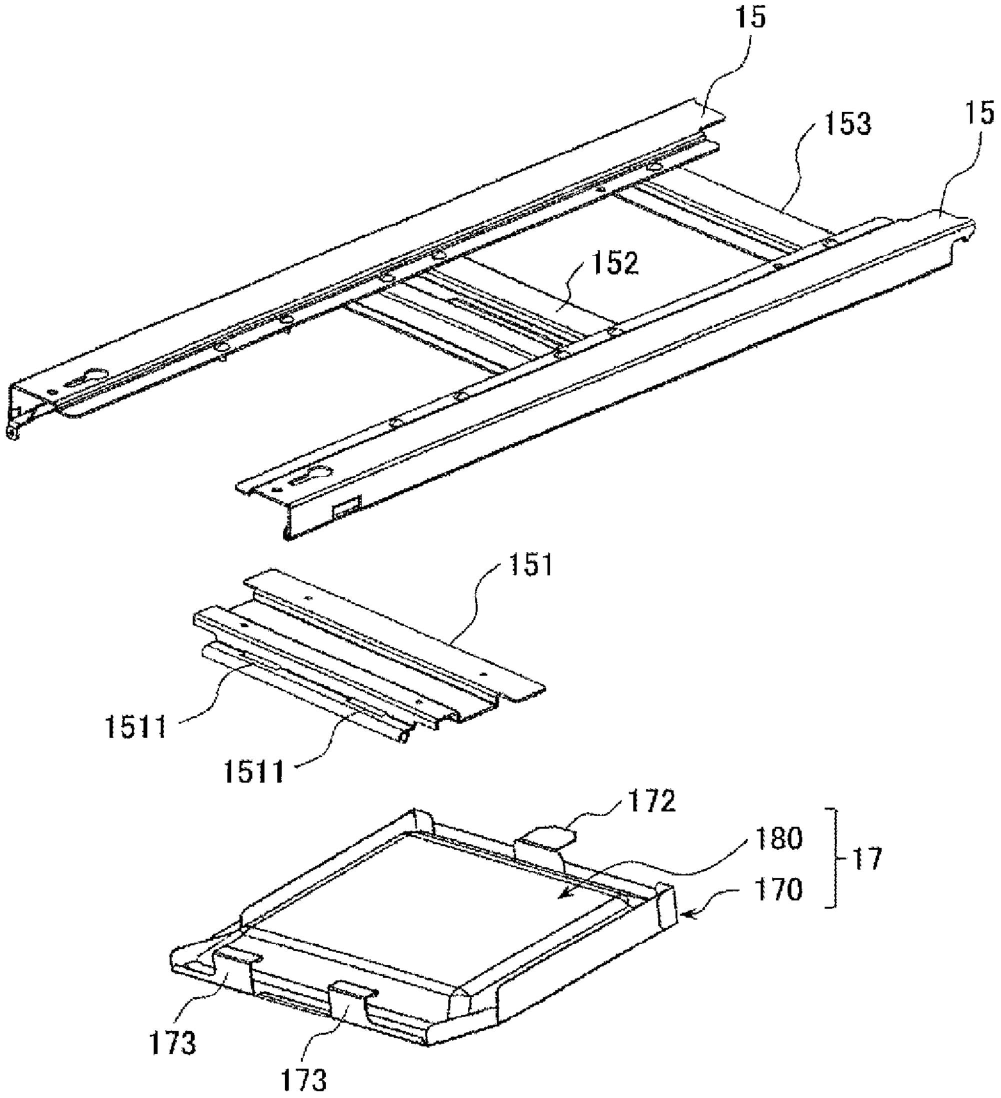

[Figure 18]
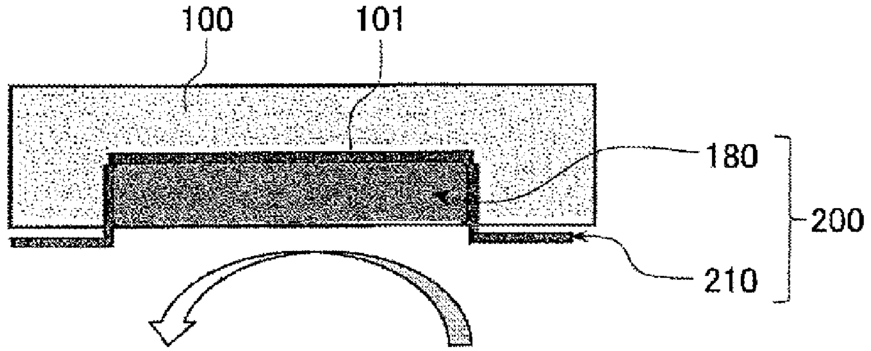
(a)
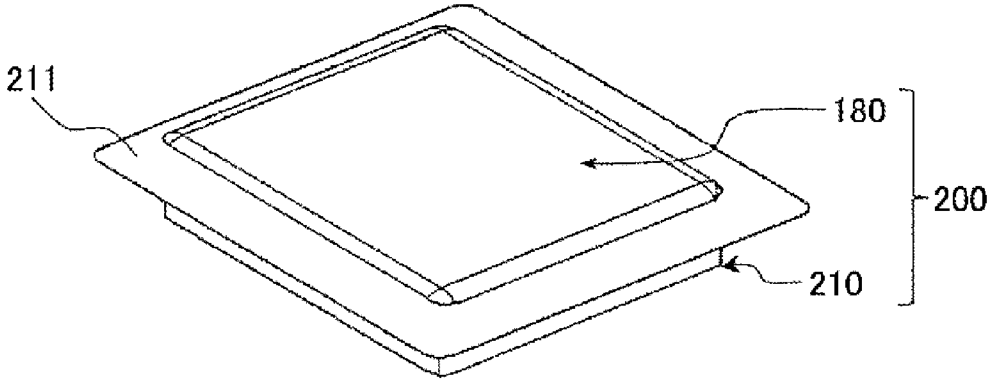
(b)
[Figure 19]
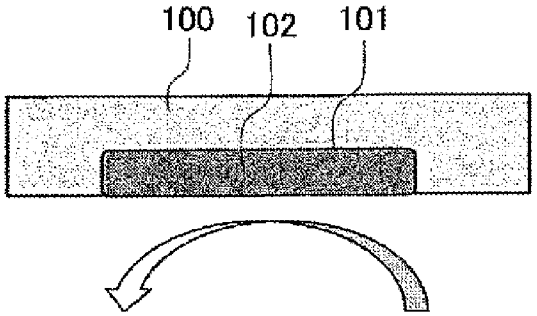

HEAT STORAGE MATERIAL UNIT, AND AUTOMATIC VENDING MACHINE EQUIPPED WITH SAID HEAT STORAGE MATERIAL UNIT

TECHNICAL FIELD

The present invention relates to a heat storage material unit which is provided with a heat storage material that stores heat by changing physically or chemically, and which is installed inside a product accommodating compartment to suppress the power consumption of an automatic vending machine or the like, and an automatic vending machine equipped with said heat storage material unit.

BACKGROUND ART

There are known automatic vending machines of this type that are provided, in a product accommodating compartment of a main body cabinet constructed as a heat-insulating housing, with a product accommodating rack (also referred to as a slant rack) in which product accommodating shelves defining product accommodating passages accommodating a plurality of products aligned lying down in a row in the front-rear direction are disposed in a plurality of levels in the vertical direction. The product accommodating shelves, which are arranged vertically in multiple levels in the product accommodating rack, are disposed inclined with a prescribed gradient such that the rear side thereof, serving as a product dispensing port, is lower than the front side thereof, serving as a product inlet port. A product dispensing device for separating and dispensing, one at a time, the products that have been accommodated lying down in the product accommodating passage is provided on each product accommodating shelf, in the vicinity of the product dispensing port. A product fall passage extending in the vertical direction is formed between the rear edges of the product accommodating shelves and a back wall of the main body cabinet. Attitude control plates that pivot between a protruding position, protruding into the product fall passage, and a retracted position, retracted from the product fall passage by being pushed open by the falling product, are disposed in the product fall passage, wherein the attitude control plates are urged by means of coil springs to protrude out toward the product fall passage, and when retracting from the product fall passage by being pushed open by the product that is falling through the product fall passage, correct the attitude of the product to a lying down attitude and absorb the falling energy of the product to reduce the falling speed thereof.

A lower portion of the product accommodating rack disposed in the product accommodating compartment is equipped with a product dispensing chute which is inclined downward toward the front, and over the entire plate surface of which a plurality of ventilation holes are formed, and a cooling/heating unit provided with an in-compartment fan for cooling or heating the products accommodated in the product accommodating passage to a temperature suitable for selling. The cooling/heating unit is provided with an evaporator/heater, and the evaporator forms a refrigeration cycle together with a compressor and a condenser which are disposed in a machine chamber in a lower portion of the main body cabinet. A duct member disposed in the vertical direction along the back wall of the main body cabinet is also provided. As a result, the configuration is such that cold air that has been cooled by the cooling/heating unit, or warm air that has been heated thereby (also referred to generically as in-compartment air), circulates by being blown out into the product accommodating compartment through the duct member as the in-compartment fan is driven, and descending through the product accommodating compartment, and then returning to the in-compartment fan by way of the ventilation holes in the product dispensing chute, in such a way as to cool or heat the products accommodated in the product accommodating rack to the selling-appropriate temperature in the course of descending through the product accommodating compartment. Furthermore, the products accommodated in the product accommodating rack can be sold when cooled or heated to the selling-appropriate temperature, and when a product selection button provided in an external door attached with freedom to open and close in a front surface opening of the main body cabinet is pressed, the product dispensing device provided on the corresponding product accommodating shelf operates, dispensing one product accommodated in the product accommodating passage. The configuration is such that, in the course of falling through the product fall passage, the attitude of the product dispensed by the product dispensing device is corrected by the attitude control plates, while the falling speed thereof is simultaneously reduced, and after landing on the product dispensing chute the product rolls or slides along the product dispensing chute and is delivered to a product removal port (for example, patent literature article 1).

In the invention disclosed in patent literature article 1, the configuration is such that the temperature in the product accommodating compartment is detected by means of a temperature detecting sensor such as a thermostat, temperature information (detected temperature) from the temperature detecting sensor is compared with a predetermined first reference temperature (lower limit temperature for cooling, and upper limit temperature for heating, also referred to as selling-appropriate temperature), and if the detected temperature from the temperature detecting sensor has not reached the reference temperature, the cooling/heating unit is driven to cool or heat the products accommodated in the product accommodating rack to the selling-appropriate temperature, after which operation transitions to a cold-maintaining operation or a warm-maintaining operation. In the cold-maintaining operation or the warm-maintaining operation, the configuration is such that the detected temperature from the temperature detecting sensor is compared with a predetermined second reference temperature (upper limit temperature for cooling, and lower limit temperature for heating), and if the detected temperature from the temperature detecting sensor exceeds (or drops below) the second reference temperature, the cooling/heating unit that was stopped when operation transitioned to the cold-maintaining operation or the warm-maintaining operation is driven, and the operation to cool or heat the products to the selling-appropriate temperature is repeated. It is known that the power consumption of the automatic vending machine increases if the cooling/heating unit operation is repeated in order to cool or heat the products accommodated in the product accommodating rack to the selling-appropriate temperature, so as to be ready to be sold, as in the invention disclosed in patent literature article 1.

In order to suppress the power consumption of such an automatic vending machine, it is known to install, inside the product accommodating compartment, a heat storage material that stores energy (heat) by changing physically or chemically (for example, patent literature article 2). With an automatic vending machine in which a heat storage material is installed inside the product accommodating compartment, as in the invention disclosed in patent literature article 2, if energy is stored in the heat storage material while the cooling/heating unit is operating (in particular during a late-night power period when the demand for power is low), the temperature in the product accommodating compartment can be maintained at a temperature close to the selling-appropriate temperature by means of the heat storage material, even when the cooling/heating unit is stopped. As a result, the cooling/heating unit can be stopped during time periods when there is a peak in the power demand.

PRIOR ART LITERATURE

Patent Literature

Patent literature article 1: Japanese Unexamined Patent Application Publication H10-283556 (paragraphs [0002], [0003], FIG. 5)

Patent literature article 2: Japanese Patent No. 2910282

SUMMARY OF THE INVENTION

Problems to be Resolved by the Invention

The invention disclosed in patent literature article 2 is excellent in that it makes it possible to provide an automatic vending machine in which a heat storage material that stores heat in a late-night power period when the demand for power is low is installed in the product accommodating compartment, thereby reducing the power consumption during periods in which the demand for power is high. Meanwhile, in the invention disclosed in document 2, the configuration is such that the heat storage material is bonded to heat-insulating panels defining the product accommodating compartment. Now, in order to increase the number of accommodated products by utilizing the internal volume of the product accommodating compartment to the maximum extent, the inside of the product accommodating compartment of an automatic vending machine is filled with product accommodating racks, and there is, in practice, no free space to bond heat storage materials. Accordingly, it is conceivable to form a recess 101 in a heat-insulating panel 100 defining the product accommodating compartment, and to accommodate a heat storage material 102 by storing the same in the recess 101, as illustrated in FIG. 19. However, if the heat storage material 102 is stored in the recess 101, the locations in which the heat storage material 102 comes into contact with the in-compartment air are limited to places that are exposed from the recess 101, and it therefore takes time for the heat storage material 102 to solidify (store heat) or melt (dissipate heat). The fact that it takes time for the heat storage material 102 to dissipate heat means that when the temperature in the product accommodating compartment is being maintained at a temperature in the vicinity of the selling-appropriate temperature by means of the heat storage material 102, only a portion of the surface area of the heat storage material 102 is utilized for heat dissipation, and this results in the problem that the quantity or the volume of the heat storage material 102 must be increased.

The present invention takes account of these points, and the objective thereof is to resolve the abovementioned problems by providing a heat storage material unit with which the solidification/melting efficiency of the heat storage material can be improved, and an automatic vending machine equipped with the heat storage material unit.

Means of Overcoming the Problem

In order to achieve the abovementioned objective, the invention as claimed is characterized in that a heat storage material covered with an exterior covering material is accommodated in a metal accommodating container having a high thermal conductivity.

Further, the invention as claimed is characterized in that, in the heat storage material unit, the accommodating container is made of aluminum.

Further, the invention as claimed is characterized in that, in the heat storage material unit, the accommodating container has a thin box shape with one open surface, and has a flange around the open surface.

Further, the invention as claimed is characterized in that, in an automatic vending machine formed by disposing, in order from top to bottom in a product accommodating compartment of a main body cabinet constructed as a heat-insulating housing by means of heat-insulating panels, a product accommodating rack in which products are accommodated lying down, a product dispensing chute that is inclined downward toward the front, and a cooling/heating means including an in-compartment fan for cooling or heating the products accommodated in the product accommodating rack to a temperature suitable for selling, a heat storage material unit formed by accommodating a heat storage material covered with an exterior covering material in a metal accommodating container having a high thermal conductivity is disposed embedded in the heat-insulating panels, with the accommodating container exposed inside the product accommodating compartment.

Further, the invention as claimed is characterized in that, in an automatic vending machine formed by disposing, in order from top to bottom in a product accommodating compartment of a main body cabinet constructed as a heat-insulating housing, a product accommodating rack in which product accommodating shelves defining product accommodating passages accommodating a plurality of products aligned lying down in a row in the front-rear direction are disposed in a plurality of levels in the vertical direction, a product dispensing chute that is inclined downward toward the front, and a cooling/heating means including an in-compartment fan for cooling or heating the products accommodated in the product accommodating passages to a temperature suitable for selling, wherein the product accommodating shelves are inclined such that the rear sides thereof, serving as product dispensing ports, are lower than the front sides thereof, serving as product inlet ports, and product dispensing devices for separating and dispensing, one at a time, the products that have been accommodated lying down in the product accommodating passages are provided in the vicinity of the product dispensing ports, a heat storage material unit formed by accommodating a heat storage material covered with an exterior covering material in a metal accommodating container having a high thermal conductivity is disposed above the uppermost product accommodating shelf among the product accommodating shelves that are in multiple levels in the vertical direction.

Further, the invention as claimed is characterized in that, in the automatic vending machine, the heat storage material unit is disposed in such a way that an open surface of the accommodating container faces upward.

Advantages of the Invention

According to the heat storage material unit, or the automatic vending machine equipped with the heat storage material unit, the heat storage material unit is formed by accommodating the heat storage material, which is covered by an exterior covering material, in a metal accommodating container having a high thermal conductivity, and the heat storage material unit is installed in the automatic vending machine by being embedded in a heat-insulating panel in such a way that the accommodating container of the heat storage material unit is exposed to the surrounding atmosphere (for example, the inside of the product accommodating compartment when applied to an automatic vending machine), thereby enabling the surface of the heat storage material that is embedded in the heat-insulating panel also to exhibit an action, with the accommodating container serving as a heat transfer element, equivalent to that when exposed inside the product accommodating compartment, and thereby having the advantage of improving the solidification (heat storage)/melting (heat dissipation) efficiency of the heat storage material, even if the heat storage material unit is installed in such a way as to be embedded in the heat-insulating panel in order to reduce the space required to install the heat storage material unit.

Further, according to the automatic vending machine as claimed in claim 5, the automatic vending machine is formed by disposing, in order from top to bottom in a product accommodating compartment of a main body cabinet constructed as a heat-insulating housing, a product accommodating rack in which product accommodating shelves defining product accommodating passages accommodating a plurality of products aligned lying down in a row in the front-rear direction are disposed in a plurality of levels in the vertical direction, a product dispensing chute that is inclined downward toward the front, and a cooling/heating means including an in-compartment fan for cooling or heating the products accommodated in the product accommodating passages to a temperature suitable for selling, wherein the product accommodating shelves are inclined such that the rear sides thereof, serving as product dispensing ports, are lower than the front sides thereof, serving as product inlet ports, and product dispensing devices for separating and dispensing, one at a time, the products that have been accommodated lying down in the product accommodating passages are provided in the vicinity of the product dispensing ports, and wherein a heat storage material unit formed by accommodating a heat storage material covered with an exterior covering material in a metal accommodating container having a high thermal conductivity is disposed above the uppermost product accommodating shelf among the product accommodating shelves that are in multiple levels in the vertical direction, in other words, disposed in a dead space arising as a result of the product accommodating shelves being disposed inclined with a predetermined gradient such that the rear sides thereof are lower than the front sides thereof, and thus the invention exhibits the advantage that the dead space can be effectively utilized, making it possible to provide an automatic vending machine equipped with a heat storage material, without changing the external dimensions of the automatic vending machine.

BRIEF EXPLANATION OF THE DRAWINGS

FIG. 1 is a front elevation of an automatic vending machine illustrating an embodiment of the present invention.

FIG. 2 is an oblique view of a state in which an external door and a heat-insulating internal door of the automatic vending machine in FIG. 1 have been opened.

FIG. 3 is a cross-sectional side view of the automatic vending machine in FIG. 1.

FIG. 4 is an enlarged cross-sectional side view illustrating an upper part of the automatic vending machine in FIG. 3.

FIG. 5 is an oblique view of a product accommodating rack and a guide fitting in FIG. 3, as seen from diagonally above to the right.

FIG. 6 illustrates an upper part of the guide fitting and the product accommodating rack in FIG. 5 in an enlargement, where (a) is an oblique view of a state in which the product accommodating rack has been removed from the guide fitting, and (b) is an oblique view of a state in which the product accommodating rack is fixedly latched to and suspended from the guide fitting.

FIG. 7 is an exploded view of the product accommodating rack.

FIG. 8 illustrates a product accommodating shelf to which a product dispensing device has been attached, where (a) is an oblique view as seen from diagonally above to the right, and (b) is a rear oblique view of (a).

FIG. 9 illustrates a dividing member, where (a) is a top oblique view, and (b) is a rear oblique view of (a).

FIG. 10 illustrates an attitude control plate, where (a) is an oblique view as seen from diagonally above to the right at the rear, and (b) is an exploded oblique view of (a).

FIG. 11 illustrates an in-compartment upper fan, where (a) is an exploded view of the in-compartment upper fan and an attachment member, and (b) is an assembled view thereof.

FIG. 12 illustrates two front and rear heat storage material units and the in-compartment upper fan, together with the guide fitting, where (a) is an oblique view thereof in a coupled state, as seen from diagonally above to the right, and (b) is an exploded view thereof.

FIG. 13 illustrates a heat storage material, where (a) is a side view, and (b) is a plan view.

FIG. 14 illustrates a rear side heat storage material unit together with a retaining fitting, where (a) is an exploded view, (b) is an assembled view of the heat storage material unit, and (c) is an assembly state view illustrating cooperation between the heat storage material unit and the retaining fitting.

FIG. 15 is an exploded view illustrating the relationship between the retaining fitting that retains the rear side heat storage material unit, and a reinforcing fitting that is installed horizontally across the guide fittings, with the reinforcing fitting disassembled from the guide fittings.

FIG. 16 illustrates the rear side heat storage material unit, where (a) is an exploded view, and (b) is an assembled view of the heat storage material unit.

FIG. 17 is an exploded view illustrating the relationship between the rear side heat storage material unit and a reinforcing fitting that is installed horizontally across the guide fittings, with the reinforcing fitting disassembled from the guide fitting.

FIG. 18 illustrates a heat storage material unit according to a different embodiment of the present invention, where (a) is a schematic cross-sectional view of a state in which the heat storage material unit has been attached to a heat-insulating panel, and (b) is an oblique view of the heat storage material unit.

FIG. 19 is a schematic cross-sectional view of a state in which a conventional heat storage material has been bonded to a heat-insulating panel.

MODES OF EMBODYING THE INVENTION

An automatic vending machine according to an embodiment of the present invention will now be described in detail with reference to the drawings. FIG. 1 is a front elevation of an automatic vending machine for selling canned beverages and PET bottled beverages, being an example of an automatic vending machine according to an embodiment of the present invention, FIG. 2 is an oblique view of a state in which an external door and a heat-insulating internal door of the automatic vending machine in FIG. 1 have been opened, FIG. 3 is a cross-sectional side view of the automatic vending machine in FIG. 1, FIG. 4 is an enlarged cross-sectional side view illustrating an upper part of the automatic vending machine in FIG. 3, FIG. 5 is an oblique view of a product accommodating rack and a guide fitting in FIG. 3, as seen from diagonally above to the right, and FIG. 6 illustrates an upper part of the guide fitting and the product accommodating rack in FIG. 5 in an enlargement, where (a) is an oblique view of a state in which the product accommodating rack has been removed from the guide fitting, and (b) is an oblique view of a state in which the product accommodating rack is suspended from the guide fitting. It should be noted that "left" and "right" in the following description refer to the left and right as seen from the front of the automatic vending machine.

As illustrated in FIG. 1, the automatic vending machine is provided with a main body cabinet 1 formed as a heat-insulating housing of which the front surface is open, and an external door 2 supported on the front surface of the main body cabinet 1 in such a way as to be capable of opening and closing, in a manner that closes the front surface opening of the main body cabinet 1, wherein a product removal port 2*a* is provided in the external door 2. The main body cabinet is constructed as a heat-insulating housing by disposing heat-insulating panels made of urethane foam on the inside of an outer casing made of steel plate, in other words, on an upper wall 1*a*, left and right side walls 1*b*, a back wall 1*c*, and a bottom wall 1*d* (see FIG. 3), wherein a space enclosed by the heat-insulating panels disposed on the upper wall 1*a*, the left and right side walls 1*b*, the back wall 1*c*, and the bottom wall 1*d* is formed as a product accommodating compartment, and a lower portion of the product accommodating compartment is formed as a machine chamber 8. The inside of the product accommodating compartment enclosed by the heat-insulating panels of the main body cabinet 1 is partitioned in the left-right direction into three product accommodating chambers 12, 13, 14 by means of heat insulating dividing plates 11, 11 (see FIG. 2). Product accommodating racks 4 each including product accommodating shelves 10 disposed in multiple levels in the vertical direction are accommodated and installed in each product accommodating chamber 12, 13, 14. The product accommodating chamber 12 is a product cooling compartment dedicated to cooling, and the product accommodating chambers 13 and 14 are combined cooling/heating compartments capable of being switched between cooling and heating.

The open front surface of the product accommodating compartment in the main body cabinet 1 is closed by means of the heat-insulating internal door 3 (see FIG. 2), which is supported on the main body cabinet 1 by means of a hinge mechanism in such a way as to be capable of opening and closing. In this example, the heat-insulating internal door 3 comprises an upper internal door 3*a* and a lower internal door 3*b*, and product dispensing units 3*c* (see FIG. 3) having dispensing opening flappers 3*d* which are pushed open by products delivered from inside the product accommodating compartment are provided in the lower internal door 3*b*. The dispensing opening flappers 3*d* are pivotally supported at an upper edge and hang down, closing the product dispensing units 3*c* under their own weight to prevent an outflow of warm air or cold air, and are formed in such a way as to be pushed open by products dispensed via the product dispensing chute 6, to deliver the products to a product receiving box 2*g* in the external door 2.

As illustrated in FIG. 5, the product accommodating racks 4 are each provided with a left and right pair of rack side plates 41, 41 made from rectangular flat plate-shaped thin steel plates. Each of the left and right pair of rack side plates 41, 41 is divided into a front side rack member 41F and a rear side rack member 41R, and the front side rack member 41F and the rear side rack member 41R are linked together to form the single rack side plate 41. The product accommodating shelves 10 are suspended between the left and right pairs of rack side plates 41, 41. The product accommodating shelves 10 are suspended in multiple levels in the vertical direction (ten levels in this embodiment) between the left and right rack side plates 41, 41, in such a way as to be inclined with a prescribed gradient such that the front sides thereof, serving as product inlet ports 44 (see FIG. 3), are higher, and the rear sides thereof, serving as product dispensing ports 45, are lower. A mechanism latching member 10A is suspended between the left and right pair of rack side plates 41, 41, above the uppermost product accommodating shelf 10. The upper edges of the front side rack members 41F and the rear side rack members 41R forming the left and right pairs of rack side plates 41, 41 are provided with engaging portions 41F1, 41R1 (see FIG. 6) formed by bending the upper edges outward in a hook shape. The engaging portions 41F1, 41R1 are configured to be capable of engaging with and disengaging from a left and right pair of guide fittings 15, 15 that are laid across a ceiling surface of the product accommodating compartment. The product accommodating racks 4 are installed in the product accommodating compartment by causing the engaging portions 41F1, 41R1 to engage with the guide fittings 15, 15.

As illustrated in FIG. 6, the left and right pair of guide fittings 15, 15 are made from thick steel plates provided with a horizontal surface 15*a* and a vertical surface 15*b*, and are laid across the ceiling surface of the product accommodating compartment by fixedly latching a front portion of the horizontal surface 15*a* and a rear end portion of the vertical surface 15*b* to reinforcing members RF1, RF2 (see FIG. 4) that are disposed in such a way as to extend in the left-right direction at the front and rear of the ceiling surface of the main body cabinet 1 (the front ends are fastened to the reinforcing member RF1 by means of bolts BT, and the rear ends are fixedly latched to the reinforcing member RF2). Rail portions 15*c* that are bent inward in a hook shape to face one another are provided along the lower edges of the vertical surfaces of the left and right pair of guide fittings 15, 15, and are configured such that the engaging portions 41F1, 41R1 of the left and right pair of rack side plates 41, 41 engage with and disengage from the rail portions 15*c*. A plurality of reinforcing fittings 151, 152, 153 are installed horizontally across the left and right pair of guide fittings 15, 15. The plurality of reinforcing fittings 151, 152, 153 are provided with increased mechanical strength by being bent in such a way as to have a recessed shape in cross section, and are screwed to the horizontal surfaces 15*a* of the left and right pair of guide fittings 15, 15.

Dividing members 42 (see FIG. 4 to FIG. 7) are fitted to the product accommodating shelves 10. The dividing members 42 define product accommodating passages 43 (product columns) accommodating a plurality of products that are aligned lying down in a row in the front-rear direction. Product dispensing devices 5 for separating and dispensing, one at a time, products S accommodated in the product accommodating passages 43 are attached to upper portions of the product accommodating passages 43 defined by the product accommodating shelves 10, in this embodiment, on a lower surface side of the upper-level side product accommodating shelf 10, in the vicinity of the product dispensing ports 45 of the product accommodating passages 43. Further, attachments (which are not shown in the drawings) for adjusting gaps between the product dispensing devices 5 and passage surfaces of the product accommodating passages 43 are laid across the product accommodating shelves 10, as necessary. The mechanism latching member 10A suspended above the uppermost product accommodating passage 43 is used in order to attach the product dispensing device 5 for separating and dispensing, one at a time, the products accommodated in the uppermost product accommodating passage 43.

An in-compartment upper fan F2 is disposed in a position above the rear end of the mechanism latching member 10A. The region above the rear end of the mechanism latching member 10A is a location that is a dead space, by virtue of the fact that the mechanism latching member 10A is disposed inclined with a prescribed gradient such that the rear side is lower than the front side, and the in-compartment upper fan F2 is disposed utilizing this dead space. The in-compartment upper fan F2 blows in-compartment air that has risen through an upper duct member 70*b* downwards, and is suspended from the left and right pair of rack side plates 41, 41. Further, two heat storage material units 16, 17 are disposed in the front-rear direction in a region forward of the in-compartment upper fan F2, which is a dead space by virtue of the fact that the mechanism latching member 10A and the product accommodating shelves 10 are disposed inclined with a prescribed gradient such that the rear sides thereof are lower than the front sides thereof. The heat storage material units 16, 17 are discussed in detail hereinafter, but are obtained by accommodating a heat storage material 180 covered with an exterior covering material in metal accommodating containers 160, 170 having a high thermal conductivity.

The rear ends (product dispensing ports 45) of the product accommodating shelves 10 disposed vertically in multiple levels in each product accommodating rack 4 are positioned on the same vertical line, and an interval between the product dispensing ports 45 and the upper duct member 70*b* is formed as a product fall passage 46 (see FIG. 3) through which the products S fall. Attitude control plates 47 which have a center of rotation in the vicinity of the rear end portion of each product accommodating shelf 10, and which pivot between a protruding position, protruding into the product fall passage 46, and a retracted position, retracted from the product fall passage 46 by being pushed open by a falling product, are disposed in the product fall passage 46. The attitude control plates 47 are urged by means of coil springs 470 (see FIG. 10) to protrude out toward the product fall passage 46, and when retracting from the product fall passage 46 by being pushed open by the product that is falling through the product fall passage 46, have the function of correcting the attitude of the product to a lying down attitude, and absorbing the falling energy of the product to reduce the falling speed thereof. The attitude control plates 47 are disposed suspended between the left and right pair of rack side plates 41, 41. Further, a cover member 48 (see FIG. 2) is suspended between lower portions of the left and right pair of rack side plates 41, 41 (front side rack members 41F, 41F). The cover member 48 is disposed in a region below the lowermost product accommodating shelf 10, and fulfills the function of preventing a hand reaching the lowermost product accommodating shelf 10 in the event that the hand is inserted from the product removal port 2*a* of the external door 2. It should be noted that the cover member 48 is formed with a recessed cross-sectional shape, and can therefore be utilized as a storage location for accessories (such as the attachments, not shown in the drawings, that are fitted to the product accommodating shelves).

A lower portion of the product accommodating rack has disposed therein a product dispensing chute 6 which is disposed inclined downward toward the front in such a way as to link a lower region of the product fall passage 46 and the product dispensing units 3*c* provided in the heat-insulating internal door 3, and over the plate surface of which a plurality of ventilation holes are formed, a cooling/heating unit 7 for cooling or heating the products accommodated in the product accommodating rack 4 so as to be stored in a cold or hot state, and an in-compartment temperature sensor, which is not shown in the drawings, wherein the product accommodating rack 4, the product dispensing chute 6, and the cooling/heating unit 7 are installed in order from top to bottom inside the product accommodating compartment.

As illustrated in FIG. 3, the cooling/heating unit 7 is disposed in a space behind the product dispensing chute 6, which is disposed inclined downward toward the front. The cooling/heating unit 7 is provided with an evaporator 7*a*, a heater 7*b*, and an in-compartment lower fan F1, and the evaporator 7*a*, the heater 7*b*, and the in-compartment lower fan F1 are arranged side by side in the front-rear direction, in the order, from the front side, of the in-compartment lower fan F1, the heater 7*b*, and the evaporator 7*a*. The rotational speed of the in-compartment lower fan F1 can be varied by performing voltage control or PWM control of a fan drive motor. The in-compartment lower fan F1, the heater 7*b*, and the evaporator 7*a* are each disposed in enclosing and protecting wind tunnels, and a spacer wind tunnel 70 is provided continuously with the wind tunnel of the heater 7*b*. As a whole, the wind tunnels of the in-compartment lower fan F1, the heater 7*b* and the evaporator 7*a*, and the wind tunnel 70 have a continuous tunnel shape. Furthermore, a lower duct member 70*a* is provided continuous with the wind tunnels of the cooling/heating unit 7 and the wind tunnel 70. The lower duct member 70*a* is disposed along the product accommodating compartment back surface (the back wall 1*c* of the main body cabinet 1), and is provided with an inlet side opening (which is not shown in the drawings) facing the outlet of the wind tunnel 70, and an outlet side opening (which is not shown in the drawings) that communicates with a lower region of the product fall passage 46. The upper duct member 70*b* is disposed communicating with the outlet side opening of the lower duct member 70*a*. The upper duct member 70*b* is made from thin steel plate having a U-shaped cross section and extending in the vertical direction, and is suspended between the left and right pair of rack side plates 41, 41, along the back wall 1*c* of the main body cabinet 1. In other words, the width of the upper duct member 70*b* in the left-right direction corresponds to the width between the left and right pair of rack side plates 41, 41. Furthermore, the upper duct member is suspended between the left and right pair of rack side plates 41, 41 by screwing leg pieces (flanges) on the left and right of the U-shape to the rear side rack members 41R that constitute the left and right pair of rack side plates 41, 41.

In addition, a refrigerator condensing unit 9 which forms a refrigeration cycle together with the evaporator 7*a* of the cooling/heating unit 7 is disposed in the machine chamber 8 in the lower portion of the main body cabinet 1. The refrigerator condensing unit 9 includes a compressor 9*a*, a condenser 9*b*, an out-of-compartment fan 9*c*, and an electromagnetic valve and an expansion valve (which are not shown in the drawings), and the condenser 9*b* disposed outside the product accommodating compartment and the evaporator 7*a* disposed inside the product accommodating compartment are connected by means of refrigerant piping, by way of the electromagnetic valve and the expansion valve.

The external door 2 has a sufficient size to cover the front surface opening in the main body cabinet 1. As illustrated in FIG. 1, the front surface side of the external door 2 includes a display chamber 22 for exhibiting a plurality of product samples 21 arranged in the left-right direction, and a product selection button unit 24 provided with product selection buttons 24*a* is disposed on the front surface of a transparent plate 23 covering the display chamber 22. A coin insertion opening 25, a banknote insertion opening 26, an electronic payment antenna unit 27, a return lever 28, an integrated display 29, a coin return opening 30, and a handle lock device 31 are provided in a region of the front surface side of the external door 2 at the right edge of the display chamber 22. As illustrated in FIG. 2, a coin processing machine 2*b*, a banknote processing machine 2*c*, a coin collecting box 2*d*, a control box 2*e*, a remote control setting unit 2*f*, a product receiving box 2*g*, and the like, are provided on the rear surface side of the external door 2. It should be noted that decorative members 20 are attached to the left edge side and the top portion of the external door 2, as illustrated in FIG. 1 and FIG. 2.

The product selection buttons 24*a* are push-button switches for a user to select a product to purchase. The coin insertion opening 25 is an opening for the user to insert coins. The authenticity and denomination of coins inserted through the coin insertion opening 25 are identified by the coin processing machine 2*b*, and in the case of authentic currency, the coins are stored in change tubes corresponding to the denomination (or stored in the coin collecting box 2*d* if the change tube is full), while in the case of counterfeit currency, the coins are returned to the coin return opening 30. The banknote insertion opening 26 is an opening for the user to insert banknotes. The authenticity and denomination of banknotes inserted through the banknote insertion opening 26 are identified by the banknote processing machine 2*c*, and in the case of authentic currency, the banknotes are collected in an accommodating portion of the banknote processing machine 2*c*, while in the case of counterfeit currency, the banknotes are returned to the banknote insertion opening 26. The electronic payment antenna unit 27 is used to exchange electronic data and to settle payments via a network when an IC card or a mobile telephone is held up. The return lever 28 is operated if the user abandons the purchase of a product after inserting a coin or a banknote, and when the return lever 28 is operated, the coin or banknote that has been inserted is returned to the coin return opening 30 or the banknote insertion opening 26. The integrated display 29 displays various types of information to the user, such as the amount of money inserted, whether products are for sale, and whether there is any change. The handle lock device 31 is capable of locking the external door 2 to the main body cabinet 1 in a closed state, and releasing the lock using a key.

The control box 2*e* performs integrated control of the automatic vending machine, and is connected to the compressor 9*a* of the refrigerator condensing unit 9, the electromagnetic valve (which is not shown in the drawings) for feeding and stopping the feed of refrigerant to the evaporator 7*a*, the heater 7*b*, the in-compartment lower fan F1, the in-compartment upper fan F2, and the in-compartment temperature sensor, which is not shown in the drawings, for example. Furthermore, on the basis of temperature information from the in-compartment temperature sensor, the control box 2*e* controls the compressor 9*a*, the electromagnetic valve, the in-compartment lower fan F1, the in-compartment upper fan F2, and the heater 7*b* in accordance with a program and initial data stored in advance in a memory, thereby cooling or heating the products accommodated in the product accommodating racks 4 to the selling-appropriate temperature, and then transitioning to a cold-maintaining operation or a warm-maintaining operation to maintain the temperature inside the product accommodating compartment in a desired temperature state.

The product receiving box 2*g* is formed as a cuboid box-shaped structure which is long in the left-right direction and which has a front surface and a rear surface that are open, is disposed in such a way that the open front surface faces the product removal port 2*a* and the open rear surface faces the plurality of product dispensing units 3*c* of the lower internal door 3*b*, and receives products dispensed from the product accommodating racks 4. A removal port door 2*h* (see FIG. 1) which opens and closes the product removal port 2*a* provided opening in the external door 2 for removal of products delivered to the product receiving box 2*g*, and an anti-theft plate 2*j* (see FIG. 2) restricting entry of an arm from the product removal port 2*a*, for example, are provided integrally with the product receiving box 2*g*.

As illustrated in FIG. 8, each product accommodating shelf 10 comprises a front-side shelf member 10F and a rear-side shelf member 10R which are divided in the front-rear direction. The front-side shelf member 10F is mainly used for adjusting the dividing members 42. The rear-side shelf member 10R is mainly used for attaching the product dispensing device 5, and the product dispensing device 5 is attached to the back surface thereof. The front-side shelf member 10F and the rear-side shelf member 10R are each made from rectangular flat plate-shaped thin steel plate. Reinforcement of the front-side shelf member 10F and the rear-side shelf member 10R is achieved by forming flanges 10F1, 10F1 and flanges 10R1, 10R1 that are respectively bent downward from the left and right side edges of the rectangular plate surface. It should be noted that the width, in the left-right direction, between the left and right flanges 10R1, 10R1 of the rear-side shelf member 10R is formed to be slightly greater than the width, in the left-right direction, between the left and right flanges 10F1, 10F1 of the front-side shelf member 10F, the configuration being such that the left and right flanges 10F1, 10F1 of the front-side shelf member 10F can be sandwiched between the left and right flanges 10R1, 10R1 of the rear-side shelf member 10R.

A front edge part of the front-side shelf member 10F is bent downward to form a downhanging portion 110. In the plate surface of the front-side shelf member 10F are formed: a guide groove 111, formed as a slit extending in the left-right direction in a position toward the front of the plate surface; two front and rear sets of setting grooves 112 which are formed as slits extending in the front-rear direction in positions to the rear of the guide groove 111, and which are formed in six rows side by side in the left-right direction; and four slit-shaped mounting grooves 113 for attaching the attachments (which are not shown in the drawings) that are fitted, as necessary, to the product accommodating shelves 10. The downhanging portion 110, the guide groove 111, and the two sets of setting grooves 112 are for fitting and adjusting the dividing members 42.

The front ends of the left and right flanges 10F1 of the front-side shelf member 10F are cut away to provide pin insertion portions 10F11 (see FIG. 8(*a*)) forming a prescribed gap to the downhanging portion 110. A pin P1 (see also FIG. 5 and FIG. 6) which is disposed straddling the left and right rack side plates 41, 41 and which supports the product accommodating shelf 10 (front-side shelf member 10F) is inserted through the pin insertion portions 10F11. Further, the rear ends of the left and right flanges 10F1 of the front-side shelf member 10F are cut away in such a way as to be positioned slightly forward of the rear edge of the plate surface of the front-side shelf member 10F. In other words, the rear edge of the plate surface of the front-side shelf member 10F is formed in such a way as to be positioned to the rear of the rear edges of the left and right flanges 10F1 of the front-side shelf member 10F, and is configured in such a way as to ride up over the plate surface of the rear-side shelf member 10R.

Six fixing portions 124 to 129 are provided in the plate surface of the rear-side shelf member 10R, positioned toward the rear of the plate surface, and a left and right pair of opening portions 130, 130 is provided in a position on the right hand side, in the left-right direction, and toward the front of the rear-side shelf member 10R. The six fixing portions 124 to 129 are formed as recessed portions by pushing the plate surface out toward the back surface side, and screw insertion holes 124*a* to 129*a* are formed in bottom surfaces of the recessed portions. The six fixing portions 124 to 129 are disposed with left-right symmetry across a midline between the fixing portion 126 and the fixing portion 127. The fixing portions 124 to 129 are for attaching the product dispensing device 5. The left and right pair of opening portions 130, 130 are for attaching the attachments (which are not shown in the drawings) that are fitted, as necessary, to the product accommodating shelf 10.

Further, pin insertion portions 10R11, 10R11 are formed by means of square notches in edge portions toward the front of the left and right flanges 10R1, 10R1 of the rear-side shelf member 10R, and curl engaging portions 10R12, 10R12 (see FIG. 8(*b*)) are formed by means of arcuate cutouts at the rear ends of the left and right flanges 10R1, 10R1. A pin P2 (see also FIG. 5 and FIG. 6) which is disposed straddling the left and right rack side plates 41, 41 and which supports the product accommodating shelf 10 (rear-side shelf member 10R) is inserted through the pin insertion portions 10R11, 10R11. The curl engaging portions 10R12, 10R12 come into contact with cylindrical portions 477 which retain the attitude control plate 47, described in FIG. 9 discussed hereinafter, and which are formed in a retaining member 476 disposed straddling the left and right rack side plates 41, 41.

In addition, the front edges of the left and right flanges 10R1, 10R1 of the rear-side shelf member 10R are configured to be positioned forward of the front edge part of the plate surface of the rear-side shelf member 10R. Furthermore, the free ends of the left and right flanges 10R1, 10R1 on the front end side thereof are bent inward to form placement pieces 10R13, 10R13 (see FIG. 8(*b*)). The placement pieces 10R13, 10R13 are used for coupling to the front-side shelf member 10F by rear end portions of the left and right flanges 10F1 of the front-side shelf member 10F being placed thereon.

Further, as discussed hereinabove, the width, in the left-right direction, between the left and right flanges 10R1, 10R1 of the rear-side shelf member 10R, is formed to be slightly greater than the width, in the left-right direction, between the left and right flanges 10F1, 10F1 of the front-side shelf member 10F, the configuration being such that the left and right flanges 10F1, 10F1 of the front-side shelf member 10F can be sandwiched between the left and right flanges 10R1, 10R1 of the rear-side shelf member 10R. Therefore, the front-side shelf member 10F and the rear-side shelf member 10R are linked together by fitting the rear end portions of the left and right flanges 10F1, 10F1 of the front-side shelf member 10F between the front end portions of the left and right flanges 10R1, 10R1 of the rear-side shelf member 10R, and laying the rear end portions of the left and right flanges 10F1 of the front-side shelf member 10F over the placement pieces 10R13, 10R13 of the rear-side shelf member 10R in such a way as to be placed thereon. In this case, the rear edge of the plate surface of the front-side shelf member 10F rests on the plate surface of the rear-side shelf member 10R, and the configuration is such that a product that is rolling or sliding along the plate surface of the front-side shelf member 10F does not impact the front edge part of the rear-side shelf member 10R.

As illustrated in FIG. 5 and FIG. 6, the front-side shelf members 10F and the rear-side shelf members 10R are attached to the left and right pairs of rack side plates 41, 41. That is, the retaining member 476 that retains the attitude control plate 47 is disposed between the left and right pair of rack side plates 41, 41, and the ends of both cylindrical portions 477 of the retaining member 476, and left and right latching pieces 478*a* are inserted into and suspended between retaining member attachment holes OP4 (described in detail using FIG. 10) provided in the left and right pair of rack side plates 41, 41, after which the pin P1 and the pin P2 are inserted into pin insertion holes OP1, OP2 (see FIG. 6) from the outside of the right-side rack side plate 41 to straddle and be suspended between the left and right pair of rack side plates 41, 41. Next, the arcuate curl engaging portions 10R12, 10R12 formed at the rear edges of the left and right flanges 10R1, 10R1 of the rear-side shelf member 10R are caused to mate with the cylindrical portions 477 formed in the retaining member 476, and the pin insertion portions 10R11, 10R11 formed toward the front of the left and right flanges 10R1, 10R1 are caused to mate with the pin P2. Then, the rear end portions of the left and right flanges 10F1, 10F1 of the front-side shelf member 10F are fitted between the front end portions of the left and right flanges 10R1, 10R1 of the rear-side shelf member 10R, after which the rear ends of the left and right flanges 10F1, 10F1 of the front-side shelf member 10F are laid over the placement pieces 10R13, 10R13 of the rear-side shelf member 10R in such a way as to be placed thereon, and the pin insertion portions 10F11, 10F11 formed at the front ends of the left and right flanges 10F1 are caused to mate with the pin P1. As a result, the front-side shelf member 10F and the rear-side shelf member 10R are suspended between the left and right rack side plates 41, 41 in a coupled state.

Here, the front-side shelf member 10F can be removed using the reverse procedure to the procedure for attaching to the rack side plates 41, discussed hereinabove, and if a product becomes jammed in the product accommodating passage 43, in particular if a product becomes jammed on the product dispensing port side of the product accommodating passage 43 in which the product dispensing device 5 is disposed, the product jam can be eliminated by removing the front-side shelf member 10F. It should be noted that the product dispensing device 5 is a known device that dispenses a sold product by causing a first stopper member 52 and a second stopper member 53 to extend into and retract from the product accommodating passage 43 alternately, where the first stopper member 52 is free to extend into and retract from the product accommodating passage 43, and is provided in such a way as to be capable of moving between a protruding position, protruding into the product accommodating passage 43 in such a way as to hold the product that is first in the selling order (sold product), and a retracted position, retracted from the product accommodating passage 43 with the holding of the sold product released, and the second stopper member 53 is free to extend into and retract from the product accommodating passage 43, and is provided in such a way as to be capable of moving between a retracted position, retracted from the product accommodating passage 43, and a protruding position, protruding into the product accommodating passage 43 in such a way as to hold the product that is second in the selling order (next sold product), following after the sold product.

The dividing members 42 are fitted to the product accommodating shelves 10 in such a way as to extend in the front-back direction, to define the product accommodating passages 43.

FIG. 9 illustrates the dividing member 42, where (a) is an oblique view as seen from diagonally above to the right, and (b) is an oblique view as seen from diagonally below to the right. The dividing member 42 is a thin steel plate that is bent into an L-shape, and comprises a product placement portion 421 parallel to the plate surface (passage surface) of the product accommodating shelf 10 comprising the front-side shelf member 10F and the rear-side shelf member 10R, and a restricting portion 422 perpendicular to the passage surface. An L-shaped mating portion 4211 that surrounds the downhanging portion 110 at the front edge of the front-side shelf member 10F is formed at the front edge of the product placement portion 421. The mating portion 4211 is loosely fitted in such a way as to wrap around the downhanging portion 110 of the front-side shelf member 10F. Further, toward the front of the plate surface of the product placement portion 421, a hook piece 421*a* protruding toward the back surface side is formed by being cut and pressed outward. The hook piece 421*a* is formed to correspond to the guide groove 111 formed as a slit extending in the left-right direction toward the front of the plate surface of the front-side shelf member 10F, and is caused to mate with the guide groove 111 in a loosely fitting manner by the tip end of the hook piece 421*a* being caused to slip below the plate surface of the front-side shelf member 10F in a state in which the plate surface has been deflected downward as a result of the edge portion of the guide groove 111 on the rear side thereof being pressed from above. In addition, rearward of the hook piece 421*a* of the product placement portion 421, a pair of front and rear engagement claws 421*b*, 421*b* that protrude toward the back surface side are formed by being cut and pressed outward. The engagement claws 421*b*, 421*b* are formed in a substantially inverted trapezoidal shape as seen from the side surface. The pair of front and rear engagement claws 421*b*, 421*b* are respectively capable of engaging with and disengaging from the front and rear setting grooves 112, 112 formed in the plate surface of the front-side shelf member 10F. It should be noted that a step is formed at the rear end side of the restricting portion 422 by means of a notch 4221, in such a way as to avoid interference with the stopper member 52 of the product dispensing device 5 discussed hereinafter, and finger catching holes 4222 through which a finger can be caught are formed toward the front.

The dividing members 42 are fitted to the product accommodating shelves 10 by being assembled with the product accommodating shelves 10 in the following manner, as illustrated in FIG. 8. That is, the tip end of the hook piece 421*a* is caused to slip below the plate surface of the front-side shelf member 10F while the plate surface is being deflected downward as a result of the edge portion of the guide groove 111 on the rear side thereof being pressed from above, in a state in which the hook piece 421*a* formed in the product placement portion 421 of the dividing member 42 is positioned on the front side of the guide groove 111 formed in the plate of the front-side shelf member 10F, in a position above the product accommodating shelf 10 (front-side shelf member 10F and rear-side shelf member 10R). In this state, the base end portion (vertical portion) of the hook piece 421*a* is positioned forward of the guide groove 111, and the product placement portion 421 of the dividing member 42 is separated from the plate surface of the product accommodating shelf 10, and the dividing member 42 is therefore moved toward the rear in such a way that the base end portion (vertical portion) of the hook piece 421*a* moves to the position of the guide groove 111. When the base end portion (vertical portion) of the hook piece 421*a* reaches the position of the guide groove 111, the base end portion (vertical portion) of the hook piece 421*a* can be fitted into the guide groove 111, and therefore if the dividing member 42 is moved downward together with the hook piece 421*a*, the product placement portion 421 approaches the plate surface of the product accommodating shelf 10. In this case, since the tip end (short-direction leg piece of the L shape) of the L-shaped mating portion 4211 of the dividing member 42 interferes with the front edge of the front-side shelf member 10F, the dividing member 42 is moved downward while the mating portion 4211 is being deflected forward to prevent interference with the front edge of the front-side shelf member 10F, until the product placement portion 421 reaches the plate surface of the product accommodating shelf 10. When the product placement portion 421 reaches the plate surface of the product accommodating shelf 10, the tip end (short-direction leg piece of the L shape) of the mating portion 4211 arrives below the downhanging portion 110 of the front-side shelf member 10F. If the external force being applied to the mating portion 4211 is released in this state, the mating portion 4211 is restored to its normal condition and wraps around the downhanging portion 110 of the front-side shelf member 10F from the front.

When the product placement portion 421 of the dividing member 42 has approached the plate surface of the product accommodating shelf 10, if the pair of front and rear engagement claws 421*b*, 421*b* of the product placement portion 421 are not located opposite the front and rear setting grooves 112, 112 formed in the plate surface of the front-side shelf member 10F (if the pair of front and rear engagement claws 421*b*, 421*b* are in contact with the plate surface of the front-side shelf member 10F), then sliding the dividing member 42 in the left-right direction to cause the pair of front and rear engagement claws 421*b*, 421*b* be located opposite the setting grooves 112, 112 and to mate therewith causes the product placement portion 421 of the dividing member 42 to fit to the plate surface of the product accommodating shelf 10 (front-side shelf member 10F and rear-side shelf member 10R) in a closely contacting state.

The dividing member 42 is fitted to the product accommodating shelf 10 in such a way as to extend in the front-back direction, to define the product accommodating passage 43, and changing the set position thereof in the product accommodating shelf 10 allows the passage width (width in the left-right direction) of the product accommodating passage 43 to be changed. FIG. 8 illustrates a case in which the dividing member 42 has been set on the left edge side of the product accommodating shelf 10 (set in the setting grooves 112, 112 on the left edge side, among the front and rear setting grooves 112, 112 formed in the plate surface of the front-side shelf member 10F), and in this case a product accommodating passage 43 corresponding to long-sized products is defined in the product accommodating shelf 10. If the set position of the dividing member 42 that has been set on the left edge side of the product accommodating shelf 10 is to be changed from this state, a finger (the thumb, for example) is pressed against the mating portion 4211 at the front edge of the dividing member 42 and a finger (the index finger, for example) is caught in one of the finger catching holes 4222 provided in the restricting portion 422 of the dividing member 42, and in this state an external force is applied in such a way as to lift the dividing member 42 upward using the finger that is caught in the finger catching hole 4222. Thereupon, the corner (corner of the L-shape) of the L-shaped mating portion 4211 of the dividing member 42, disposed in such a way as to wrap around the downhanging portion 110 of the front-side shelf member 10F, comes into contact with the lower edge of the downhanging portion 110, the rear end side of the dividing member 42 pivots about said point of contact in such a way as to rise up, and the product placement portion 421 separates from the product accommodating shelf 10 (front-side shelf member 10F and rear-side shelf member 10R) and rises up. The pivoting of the dividing member 42 is restricted by the tip end (tip end of the horizontal part) of the hook piece 421*a* coming into contact with the back surface of the front-side shelf member 10F. In a state in which the pivoting has been restricted in this way, the pair of front and rear engagement claws 421*b*, 421*b* provided in the product placement portion 421 are separated from the front and rear setting grooves 112, 112 formed in the plate surface of the front-side shelf member 10F. The dividing member 42 is slid toward the right as far as a prescribed set position (for example, the fifth setting grooves 112, 112 from the left), while being maintained in the pivoted state. If the external force being applied to the dividing member 42 is released once the dividing member 42 has been moved to the prescribed installation position, the dividing member 42 pivots downward, and the pair of front and rear engagement claws 421*b*, 421*b* provided in the product placement portion 421 engage with the prescribed setting grooves 112, 112. As a result, the product placement portion 421 of the dividing member 42 comes into close contact with the product accommodating shelf 10, and two product accommodating passages 43, 43 are defined between the restricting portion 422 of the dividing member 42 and the left and right rack side plates 41, 41. In this case, the width of the two product accommodating passages 43, 43 is a width corresponding to a half-sized product having a length that is approximately half the length of the long-sized product.

The attitude control plate 47 disposed in the vicinity of the rear edge of the product accommodating shelf 10 (rear edge of the rear-side shelf member 10R) will be described with reference to FIG. 10. FIG. 10(*a*) is an oblique view of a state in which the attitude control plate 47 has been assembled together with the retaining member 476, and (b) is an exploded view of (a).

As illustrated in FIG. 10, the attitude control plate 47 is obtained by machining one flat plate made from a thin steel plate, and includes a contacting portion 471, supporting portions 472, 473, and a stopper portion 474. The contacting portion 471 is a part that comes into contact with a product falling through the product fall passage 46, and includes a substantially rectangular flat plate-shaped contacting surface through which a plurality of ventilation holes 471*a* are formed. The supporting portions 472, 473 and the stopper portion 474 extend from the contacting portion 471, and are formed in such a way as to be divided into three branches. The free end sides of the supporting portions 472, 473 extend and curve in such a way as to separate downward from the plane of the contacting portion 471, whereas the stopper portion 474 extends along the same plane as the plane of the contacting portion 471. The supporting portions 472, 473 are formed into a first shaft portion 472*a* and a second shaft portion 473*a* by the free end sides thereof being rolled into a hollow cylindrical shape (curled shape). A rod-shaped shaft member 475 is inserted through the first shaft portion 472*a* and the second shaft portion 473*a*, and the coil spring 470, through which the shaft member 475 has been inserted, is disposed between the supporting portions 472, 473 that are divided into two branches. The free end side of the stopper portion 474 is bent at a right angle from the plane of the stopper portion 474 (the same as the plane of the contacting portion 471) to form a stopper piece 474*a*. When the contacting portion 471 of the attitude control plate 47 is in a horizontal state, the stopper piece 474*a* is positioned higher than the first shaft portion 472*a* and the second shaft portion 473*a*.

The retaining member 476 that retains the attitude control plate 47 is formed by machining a strip-shaped flat plate (in the shape of a flat plate that is elongated in the left-right direction) made from a thin steel plate, and includes the cylindrical portions 477 obtained by rolling one long edge side thereof into a hollow cylindrical shape (curled shape), and a flat plate portion 478. The latching pieces 478*a*, 478*a* are formed at both the left and right ends of the flat plate portion 478 by means of incisions having a dimension that is greater than the plate thickness of the rack side plates 41. Further, triangular bearing portions 478*b*, 478*b*, 478*b* that are pressed out so as to protrude toward the rear are formed at both the left and right ends of the flat plate portion 478 and in a central portion thereof, an opening portion 478*c* is formed between the bearing portion 478*b* on the right (on the left in FIG. 10) and the central bearing portion 478*b*, and a triangular latching portion 478*d* is formed diagonally above and to the right of the opening portion 478*c* when viewed from the front. The triangular bearing portions 478*b*, 478*b*, 478*b* retain the shaft member 475, and are formed as triangular insertion holes of which the plate surface of the flat plate portion 478 is the base, as seen from the side, by being pressed out toward the rear after slits have been provided at both the left and right ends thereof, and the shaft member 475 is inserted through said insertion holes. Further, the latching portion 478*d* latches one end of the coil spring 470, and the latching portion 478*d* is also formed as a triangular latching hole of which the plate surface of the flat plate portion 478 is the base, as seen from the side, by being pressed out after slits have been formed on the left and the right. It should be noted that the opening portion 478*c* is formed with a size enabling the coil spring 470 to be disposed therein.

To attach the attitude control plate 47 to the retaining member 476, first the coil spring 470 is disposed in the opening portion 478*c* of the retaining member 476. In this case, an urging force is imparted to the coil spring 470 in advance, and with one end inserted and latched into the latching portion 478*d* of the retaining member 476, the other end is brought into contact with the flat plate portion 478 of the retaining member 476 and is temporarily fixed using adhesive tape or the like with the urging force maintained. Then, the first shaft portion 472*a* of the attitude control plate 47 is positioned between the right side (left side in FIG. 10) bearing portion 478*b* and the central bearing portion 478*b* of the retaining member 476, and the second shaft portion 473*a* of the attitude control plate 47 is positioned between the central bearing portion 478*b* and the left side (right side in FIG. 10) bearing portion 478b of the retaining member 476. In this case, the centerlines of the coil spring 470, and the first shaft portion 472a and second shaft portion 473a of the attitude control plate 47 are positioned on the same line as the insertion holes of the bearing portions 478b, 478b, 478b of the retaining member 476. In this state, the shaft member 475 is inserted from the outside of the right side (left side in FIG. 10) bearing portion 478b of the retaining member 476, and is inserted successively through the first shaft portion 472a of the attitude control plate 47, the coil spring 470, the second shaft portion 473a of the attitude control plate 47, the central bearing portion 478b of the retaining member 476, and the left side bearing portion 478b of the retaining member 476. As a result, the shaft member 475 is retained by the bearing portions 478b, 478b, 478b of the retaining member 476, while the attitude control plate 47 is integrated with the retaining member 476 by way of the shaft member 475. The other end side of the coil spring 470, of which one end has been latched to the latching portion 478d of the retaining member 476, is then latched by causing the other end of the coil spring 470 to slip under the lower surface of the supporting portion 473 of the attitude control plate 47 while the coil spring 470 is being compressed toward said one end side. As a result, an urging force is imparted to the attitude control plate 47 by means of the coil spring 470, and the attitude control plate is subjected to a pivoting force rotating in a counterclockwise direction about the shaft member 475 when seen from the right hand side. Rotation of the attitude control plate 47 is restricted by the stopper piece 474a of the attitude control plate 47 coming into contact with the flat plate portion 478 of the retaining member 476. Furthermore, the attitude control plate 47 is configured such that in a state in which the rotation of the attitude control plate 47 is being restricted, the contacting portion 471 is substantially perpendicular to the flat plate portion 478 of the retaining member 476.

The retaining member 476 to which the attitude control plate 47 has been fitted is inserted through and suspended between the retaining member attachment holes OP4 (See FIG. 6) of which ten are formed in the vertical direction in positions toward the rear of the plate surface of the rear side rack members 41R constituting the left and right rack side plates 41. FIG. 10 is an enlarged view of the retaining member attachment hole OP4, the retaining member attachment hole OP4 comprising a round hole OP41 into which an end portion of the cylindrical portion 477 of the retaining member 476 is inserted, and a rectangular hole OP42 into which the latching pieces 478a formed at both ends of the flat plate portion 478 are inserted. Therefore, the retaining member 476 is suspended between the left and right rack side plates 41, 41 by inserting the end portions of the cylindrical portions 477 of the retaining member 476 into the round holes OP41 while at the same time inserting the latching pieces 478a of the retaining member 476 into the rectangular holes OP42, and then bending the latching pieces 478a, projecting to the outside of the rear side rack members 41R, along the plate surface of the rear side rack members 41R. In a state in which the retaining member 476 has been suspended between the left and right rack side plates 41, 41, the attitude control plate 47 is in a standby state in a protruding position protruding into the product fall passage 46 under the urging force of the coil spring 470. Then, after having been pushed open and becoming retracting from the product fall passage 46 by a product G falling through the product fall passage 46, the attitude control plate 47 is returned automatically to the protruding position, protruding into the product fall passage 46, by means of the urging force of the coil spring 470.

The mechanism latching member 10A (see FIG. 3, FIG. 4) disposed above the product accommodating passage 43 defined in the uppermost product accommodating shelf 10 is used in order to attach the product dispensing device 5 for separating and dispensing, one at a time, the products accommodated in the uppermost product accommodating passage 43 in the uppermost product accommodating shelf 10. In this embodiment, the mechanism latching member 10A uses the rear-side shelf member 10R as the product accommodating shelf 10. In this case, since the attitude control plate 47 is not disposed in the vicinity of the rear end of the mechanism latching member 10A, the retaining member 476 should be used without the attitude control plate 47.

As illustrated in FIG. 11, the in-compartment upper fan F2 disposed in a position above the rear end of the mechanism latching member 10A comprises a box-type fan. As is well known, a box-type fan comprises an attachment frame 420 including a ventilation opening 4201, and a fan motor 430 provided with a blade 431, and the attachment frame 420 includes outer peripheral frame portions 4202, a boss portion 4203 which is positioned in the center of the ventilation opening 4201 and which fixedly supports the fan motor 430, and stay portions 4204 joining the upper and lower outer peripheral frame portions 4202, 4202 to the boss portion 4203. The in-compartment upper fan F2 is suspended between the left and right pair of rack side plates 41, 41 by means of an attachment member 410 made from a thin steel plate. As illustrated in FIG. 3, the in-compartment upper fan F2 is suspended between the left and right pair of rack side plates 41, 41 in a downward facing manner by means of the attachment member 410.

As illustrated in FIG. 11, the attachment member 410 is provided with an opening 412 in a substantially central position of a base 411 corresponding to the width between the left and right pair of rack side plates 41, 41, and engaging pieces 4111, 4111 that protrude outward are provided at both the left and right ends of the base 411. Although the width, in the left-right direction, of the opening 412 is formed to be slightly larger than the width of the rectangular attachment frame 420 of the in-compartment upper fan F2, the opening 412 is formed with a trapezoidal shape corresponding to the rectangular attachment frame 420 of the in-compartment upper fan F2 such that the attachment frame 420 does not pass through. Stoppers 4121, 4121 that are bent downward in such a way as to sandwich the outer peripheral frame portion 4202 of the in-compartment upper fan F2 from the left and right, and latching pieces 4122, 4122 facing one another toward the inside to latch both the left and right edge portions of the outer peripheral frame portion 4202 on the upper side of the in-compartment upper fan F2 are formed at the left and right edges of the opening 412. A front flange 413 and a rear flange 414 are formed by bending at both the front and rear edges of the base 411.

An insertion portion 4130 formed as a cutout opening downward is provided in a central portion, in the left-right direction, of the front flange 413. The insertion portion 4130 is formed with a size that allows the rectangular attachment frame 420 of the in-compartment upper fan F2 to pass through, and the left and right edges of the insertion portion 4130 are both positioned on extension lines of the left and right stoppers 4121, 4121 of the base 411. The insertion portion 4130 is cut away in such a way as to leave supporting pieces 4131, 4131 that extend inward of both the left and right edges of the insertion portion 4130 into the open edge portion that opens downward. Furthermore, the free edge (tip edge) of the front flange 413 including the supporting pieces 4131, 4131 is bent toward the rear. As a result, the supporting pieces 4131, 4131 oppose the plate surface of the base 411. The supporting pieces 4131, 4131 support the outer peripheral frame portion 4202 of the in-compartment upper fan F2, and the gap (dimension) between the supporting pieces 4131, 4131 and the base 411 is defined to be a dimension that substantially matches the thickness of the attachment frame 420 of the in-compartment upper fan F2. Further, slits 413*a*, 413*a* are provided in the plate surface of the front flange 413. In addition, hook-shaped engaging pieces 4132, 4132 are provided respectively at the left and right outside edges of the front flange 413. A closing plate 440 closes the insertion portion 4130 of the front flange 413, and has a U-shaped vertical cross section that is somewhat larger than the width of the front flange 413. The closing plate 440 is attached in such a way as to cover the front flange 413 from the front, and is then screwed to the front flange 413. A leading-out portion 441 through which a wire W of the fan motor 430 is led out is formed in the closing plate 440 by means of a notch (the wire W is omitted in FIG. 11(*b*)).

A latching piece 4141 is provided in a central portion of the rear flange 414, in an edge portion thereof that has been cut away in such a way as to open downward, and the latching piece 4141 is formed by being bent in such a way as to project toward the rear of the plate surface of the rear flange 414, and then being bent in such a way that the tip edge faces downward. Further, hook-shaped engaging pieces 4142, 4142 are provided respectively at both the left and right ends of the rear flange 414. In addition, screw insertion holes 4143, 4143, distributed to the left and right, are provided in the rear flange 414.

Attachment of the in-compartment upper fan F2 (attachment frame 420) to the attachment member 410 is performed by positioning the in-compartment upper fan F2 (attachment frame 420) in front of the insertion portion 4130 of the front flange 413, with the attachment member 410 and the in-compartment upper fan F2 (attachment frame 420) turned upside down, and then inserting in-compartment upper fan F2 (attachment frame 420) into the insertion portion 4130. In this case, the in-compartment upper fan F2 (attachment frame 420) is inserted into the insertion portion 4130 in such a way as to be positioned between the base 411 of the attachment member 410 and the supporting pieces 4131, 4131 of the front flange 413. The in-compartment upper fan F2 (attachment frame 420) is then slid toward the rear while placed on the base 411 of the attachment member 410 and is passed between the stoppers 4121, 4121 provided at the left and right edges of the opening 412 in the base 411, and the in-compartment upper fan F2 (attachment frame 420) is then pushed in until coming into contact with the rear flange 414. Thereupon, the rear end portion of the outer peripheral frame portion 4202 on the upper side of the in-compartment upper fan F2 (attachment frame 420) slips under the latching pieces 4122, 4122 provided at the left and right edges of the opening 412 in the base 411, while the front end portion of the outer peripheral frame portion 4202 on the lower side of the in-compartment upper fan F2 (attachment frame 420) overlaps the supporting pieces 4131, 4131 of the front flange 413 in the vertical direction. In this state, the closing plate 440 is caused to cover the front flange 413 and is screwed thereto, in such a way as to close the insertion portion 4130 of the front flange 413. As a result, the in-compartment upper fan F2 (attachment frame 420) is supported by the latching pieces 4122, 4122 of the attachment member 410 and the supporting pieces 4131, 4131, and is attached integrally to the attachment member 410 in a state in which movement in the front-rear direction is prevented by means of the rear flange 414 and the closing plate 440, and movement in the left-right direction is prevented by means of the stoppers 4121, 4121.

The attachment member 410 to which the in-compartment upper fan F2 has been assembled is secured to the upper duct member 70*b* by causing the latching piece 4141 provided in the rear flange 414 to catch on the upper edge of the upper duct member 70*b*, and then screwing the same to the upper duct member 70*b* through the screw insertion holes 4143, 4143. Meanwhile, the engaging pieces 4111, 4111 provided at both the left and right edges of the base 411 of the attachment member 410 are inserted into rectangular holes OP51 (see FIG. 6) provided in the rear side rack members 41R constituting the left and right pair of rack side plates 41, 41, and the hook-shaped engaging pieces 4132, 4132 provided at both the left and right edges of the front flange 413 of the attachment member 410 and the respective hook-shaped engaging pieces 4142, 4142 provided at both the left and right edges of the rear flange 414 are inserted into rectangular holes OP52, OP52 (see FIG. 6) provided in the rear side rack members 41R constituting the left and right pair of rack side plates 41, 41, after which the hook portions of the hook-shaped engaging pieces 4132, 4142 are bent in such a way as to lie along the plate surface of the rear side rack members 41R, thereby being suspended on the left and right pair of rack side plates 41, 41.

Now, FIG. 12 illustrates the heat storage material units 16, 17 that are disposed above the uppermost product accommodating shelf 10 among the product accommodating shelves 10 that are in multiple levels in the vertical direction. FIG. 12(*a*) illustrates a state in which the heat storage material units 16, 17 have been linked to one another, and FIG. 12(*b*) is an exploded view of (a). The installation position of the heat storage material units 16, 17 is a position which is in a region forward of the in-compartment upper fan F2, and which is in a dead space that is formed between the guide fittings 15, 15, and the mechanism latching member 10A and the product accommodating shelves 10, by virtue of the fact that the mechanism latching member and the product accommodating shelves are disposed inclined with a prescribed gradient in such a way that the rear sides thereof are lower than the front sides thereof. The heat storage material units 16, 17 are obtained by accommodating the heat storage materials 180, 180 covered with an exterior covering material in the metal accommodating containers 160, 170, which have a high thermal conductivity. It should be noted that in this embodiment a description is given of a case in which the heat storage material units 16, 17 are installed in the product accommodating chamber 13, which is a compartment used for both cooling and heating, and the product accommodating chamber 13 has been switched to be a cooling compartment, but this is not a limitation.

FIG. 13 illustrates the heat storage material 180, where (a) is a side view of the heat storage material 180, and (b) is a plan view of (a). The heat storage material 180 has a flat plate-shape in which a heat storage agent having paraffin, which stores heat by changing physically or chemically, as a main component is covered by an exterior covering material 181 comprising a film that is formed in a plurality of layers by laminating. A fin part 182 is formed around the heat storage material 180 due to the characteristics of the manufacturing process used to cover the heat storage agent with the exterior covering material 181.

FIG. 14 illustrates the heat storage material unit 16, where FIG. 14(*a*) is an exploded view of the heat storage material unit 16, (b) is an assembled view of the heat storage material unit 16, and (c) is an assembly state view illustrating cooperation between the heat storage material unit 16 and a retaining fitting 19. As illustrated in FIG. 14(*a*), the heat storage material unit 16 comprises the heat storage material 180 and the accommodating container 160 which accommodates the heat storage material 180. The accommodating container 160 is made of a metal having a high thermal conductivity such as aluminum. The accommodating container 160 has a flat plate shape in an unfolded state, and has a thin box shape with one surface (top surface) open when the peripheral edges have been bent and joined by welding. The rear wall of the accommodating container 160 is provided with engaging pieces 161, 161 which are distributed to the left and right and which extend rearward from the upper edge of the rear wall. The engaging pieces 161, 161 are formed with a size capable of being inserted into the slits 413*a*, 413*a* provided in the front flange 413 of the attachment member 410 of the in-compartment upper fan F2. Further, a recessed portion 162 is formed in the front wall of the accommodating container 160. The heat storage material 180 is accommodated inside the accommodating container 160 with the peripheral edge fin part 182 bent upward. In this case, one surface of the flat plate-shaped heat storage material 180 is exposed from the open surface of the accommodating container 160, and the other surface of the heat storage material 180 is in close contact with the bottom wall of the accommodating container 160. It should be noted that in order to improve the stability of the state of accommodation of the heat storage material 180 in the accommodating container 160, it is preferable to affix adhesive tape in such a way as to straddle the front wall and the rear wall of the accommodating container 160 to restrain the heat storage material 180.

In FIG. 14, reference number 19 represents the retaining fitting for retaining the front edge of the heat storage material unit 16. The retaining fitting 19 is made from a galvanized steel plate including a placement portion 191 and a restricting portion 192 which follow the bottom wall and the front wall of the accommodating container 160 of the heat storage material unit 16. The bottom wall of the accommodating container 160 is placed on the placement portion 191. The restricting portion 192 comes into contact with the front wall of the accommodating container 160 to restrict forward movement of the heat storage material unit 16. Tongue pieces 193, 193 that are folded backward in such a way as to cover the upper portion of the front wall of the accommodating container 160 are provided on the left and right of the upper edge of the restricting portion 192. A central portion of the restricting portion 192 is cut away in such a way as to be formed one step lower than the tongue pieces 193, 193, and is configured in such a way that, when the heat storage material unit 16 and the retaining fitting are in an assembled state (see FIG. 14(*c*)), an engaging recess 162*a* is formed by closing the bottom portion side of the recessed portion 162 formed in the front wall of the accommodating container 160. Further, coupling pieces 194, 194 that extend upward are formed toward the inside of the left and right tongue pieces 193, 193 of the restricting portion 192, and screw insertion holes 194*a*, 194*a* are provided in the coupling pieces 194, 194. The coupling pieces 194, 194 are screwed to the reinforcing fitting 152 (see FIG. 12) that is installed horizontally across the left and right pair of guide fittings 15, 15, which are laid across the ceiling surface of the product accommodating compartment. It should be noted that the coupling pieces 194, 194 are bent in such a way as to be inclined forward with respect to the plate surface of the restricting portion 192, such that the placement portion 191 is inclined toward the rear when the coupling pieces 194, 194 are positioned in the vertical direction.

FIG. 15 illustrates the relationship between the retaining fitting 19 and the reinforcing fitting 152 that is installed horizontally across the left and right pair of guide fittings 15, 15, which are laid across the product accommodating compartment, and FIG. 15 illustrates a state in which the reinforcing fitting 152 has been disassembled from the left and right pair of guide fittings 15, 15. The reinforcing fitting 152 is bent in such a way as to exhibit a recessed shape in cross section, in order to increase the mechanical strength thereof, and is screwed to the horizontal surfaces 15*a* of the left and right pair of guide fittings 15, 15. A fastening portion 1521 that extends downward is provided at the rear edge of the reinforcing fitting 152, and screw holes 1521*a*, 1521*a* are formed in the fastening portion 1521. The retaining fitting 19 is secured to the reinforcing fitting 152 by disposing the screw insertion holes 194*a*, 194*a* of the coupling pieces 194, 194 in such a way as to overlap the screw holes 1521*a*, 1521*a* of the reinforcing fitting 152, and then screwing the same together.

FIG. 16 illustrates the heat storage material unit 17, where FIG. 16(*a*) is an exploded view of the heat storage material unit 17, and (b) is an assembled view of (a). As illustrated in FIG. 16(*a*), the heat storage material unit 17 comprises the heat storage material 180 and the accommodating container 170 which accommodates the heat storage material 180. The accommodating container 170 is made of a metal having a high thermal conductivity such as aluminum. The accommodating container 170 is provided with an inclined portion 171 obtained by causing a front end portion of a bottom wall to be inclined upward, and as a whole has a thin box shape with one surface (top surface) open. The inclined portion 171 is provided in order to avoid interference or collision with products being loaded onto the uppermost product accommodating shelf 10 when the heat storage material unit 17 is disposed above the uppermost product accommodating shelf 10 (see FIG. 4). An engaging piece 172 extending toward the rear is provided on the rear wall of the accommodating container 170. The engaging piece 172 is formed with a size capable of being inserted into the engaging recess 162*a* formed when the heat storage material unit 16 and the retaining fitting 19 are in an assembled state, as illustrated in FIG. 14(*c*). Further, latching protuberances 173, 173 are formed in the front wall of the accommodating container 170, distributed to the left and right. The tip end sides of the latching protuberances 173, 173 are bent backward, and the free edges that have been bent backward are formed as downward facing hooks. The latching protuberances 173, 173 are configured in such a way as to engage with the reinforcing fitting 151 (see FIG. 12) that is installed horizontally across the left and right pair of guide fittings 15, 15, which are laid across the ceiling surface of the product accommodating compartment. It should be noted that the front wall of the accommodating container 170 is formed low in order to ensure a passage for cold air circulating through the product accommodating compartment.

The heat storage material 180 is obtained by covering the heat storage agent with the exterior covering material 181, and is accommodated inside the accommodating container 170 with the peripheral edge fin part 182 bent in an extended state. In this case, one surface of the flat plate-shaped heat storage material 180 is exposed from the open surface of the accommodating container 170, and the other surface of the heat storage material 180 is in close contact with the bottom wall of the accommodating container 170. It should be noted that in order to improve the stability of the state of accommodation of the heat storage material 180 in the accommodating container 170, it is preferable to affix adhesive tape in such a way as to straddle the front wall and the rear wall of the accommodating container 170 to restrain the heat storage material 180.

FIG. 17 illustrates the relationship between the latching protuberances 173, 173 provided on the front wall of the accommodating container 170, and the reinforcing fitting 151 that is installed horizontally across the left and right pair of guide fittings 15, 15, which are laid across the product accommodating compartment, and FIG. 17 illustrates a state in which the reinforcing fitting 151 has been disassembled from the left and right pair of guide fittings 15, 15. The reinforcing fitting 151 is bent in such a way as to exhibit a recessed shape in cross section, and is screwed to the horizontal surfaces 15*a* of the left and right pair of guide fittings 15, 15. Engagement holes 1511, 1511 are formed in the front side of the reinforcing fitting 151, distributed to the left and right. One end (front end) of the accommodating container 170 is secured to the reinforcing fitting 151 by causing the hooks of the latching protuberances 173, 173 to engage with the engagement holes 1511, 1511 of the reinforcing fitting 151 in such a way as to catch therein.

The heat storage material units 16, 17 are disposed above the uppermost product accommodating shelf 10 among the product accommodating shelves 10 that are in multiple levels in the vertical direction, and the arrangement method thereof will now be described.

The heat storage material unit 16 is temporarily fixed to the product accommodating rack 4 at a stage prior to accommodating the product accommodating rack 4 to the product accommodating compartment. That is, after the product accommodating shelves 10, the attitude control plates 47, the upper duct member 70*b*, the in-compartment upper fan F2 (attachment frame 420), and the like, have been attached to the left and right pair of rack side plates 41, the engaging pieces 161, 161 provided on the rear wall of the accommodating container 160 of the heat storage material unit 16 are inserted into the slits 413*a*, 413*a* provided in the front flange 413 of the attachment member 410 of the in-compartment upper fan F2. If the hand is released from the heat storage material unit 16 in a state in which the engaging pieces 161, 161 have been inserted as far as the base portion side thereof into the slits 413*a*, 413*a*, the front edge of the accommodating container 160 of the heat storage material unit 16 swings about the base portion side of the engaging pieces 161, 161 and comes into contact with the mechanism latching member 10A, temporarily fixing the heat storage material unit 16 in state in which the engaging pieces 161, 161 are engaged with the slits 413*a*, 413*a*. In this case, since the mechanism latching member 10A is inclined with a prescribed gradient such that the rear side thereof is lower than the front side thereof, forward movement of the heat storage material unit 16 is suppressed, and the heat storage material unit 16 is temporarily fixed to the product accommodating rack 4 in a state in which the engaging pieces 161, 161 are engaged with the slits 413*a*, 413*a*. In a state in which the heat storage material unit 16 has been temporarily fixed to the product accommodating rack 4 in this way, the product accommodating rack 4 is fixedly latched to the left and right pair of guide fittings 15, 15 that are laid across the ceiling surface of the product accommodating compartment.

Next, the retaining fitting 19 is inserted, such that the placement portion 191 faces toward the rear, from the product inlet port 44 of the uppermost product accommodating shelf 10 suspended in the product accommodating rack 4 that has been accommodated and installed in the product accommodating compartment. In this case, the dividing member 42 mounted on the uppermost product accommodating shelf 10 is removed. Then, after the retaining fitting 19 has been passed through the space above the front edge of the mechanism latching member 10A, the front edge of the heat storage material unit 16 (accommodating container 160) is lifted using a tool such as a screwdriver, and the placement portion 191 of the retaining fitting 19 is slipped under the heat storage material unit 16 (bottom portion of accommodating container 160). The screw insertion holes 194*a*, 194*a* of the coupling pieces 194, 194 that extend upward from the restricting portion 192 of the retaining fitting 19 are then matched with the screw holes 1521*a*, 1521*a* provided in the fastening portion 1521 at the rear edge of the reinforcing fitting 152 that is installed horizontally across the left and right pair of guide fittings 15, 15, which are laid across the ceiling surface of the product accommodating compartment, after which screws are screwed in from the screw insertion holes 194*a*, 194*a*, fastening the two together. As a result, the heat storage material unit 16 (accommodating container 160) is suspended in a state in which the rear edge thereof is latched to the in-compartment upper fan F2 (attachment member 410), and the front edge is retained by the retaining fitting 19. The heat storage material unit 16 (accommodating container 160) that has been suspended in this way is separated from the mechanism latching member 10A and is inclined in such a way as to follow the mechanism latching member 10A, and a cold air circulating passage is formed between the heat storage material unit 16 (accommodating container 160) and the mechanism latching member 10A.

Finally, the heat storage material unit 17 (accommodating container 170) is inserted from the product inlet port 44 of the uppermost product accommodating shelf 10, in such a way that the engaging piece 172 that extends toward the rear and that is continuous with the rear wall of the accommodating container 170 faces toward the rear. The engaging piece 172 is then caused to mate with the engaging recess 162*a* that is formed when the heat storage material unit and the retaining fitting 19 are in an assembled state. The hooks of the latching protuberances 173, 173 formed on the front wall of the accommodating container 170 are then caused to engage with and catch in the engagement holes 1511, 1511 formed on the front side of the reinforcing fitting 151 that are installed horizontally across the left and right pair of guide fittings 15, 15, which are laid across the ceiling surface of the product accommodating compartment. As a result, the heat storage material unit 17 (accommodating container 170) is suspended in a state in which the rear edge thereof is retained by the retaining fitting 19, and the front edge is secured to the reinforcing fitting 151. It should be noted that the dividing member 42 that has been removed should be fitted to the product accommodating shelf 10 after the heat storage material unit 17 (accommodating container 170) has been suspended.

In the automatic vending machine configured in this way, the products accommodated in the product accommodating racks 4 are cooled or heated to the selling-appropriate temperature in accordance with a program stored in advance in the memory (which is not shown in the drawings) in the control box 2*e*, on the basis of temperature information from the in-compartment temperature sensor, after which operation transitions to a cold-maintaining operation or a warm-maintaining operation to maintain the temperature inside the product accommodating compartment in a desired temperature state. In this case, the required energy (heat) is adequately stored in the heat storage materials 180 in the heat storage material units 16, 17 during the operation of the compressor 9*a* and the cooling/heating unit 7 in the late-night power period (11 pm to 7 am) in which the demand for power is low. Then, when the compressor 9*a* and the cooling/heating unit 7 are stopped during the time period (1.30 pm to 6 pm) when there is a peak in the demand for power, the in-compartment lower fan F1 is driven to generate a circulating airflow that passes through the heat storage material units 16, 17. As a result, a rise in the temperature inside the product accommodating compartment is suppressed by means of the energy (heat) stored in the heat storage materials 180, 180 of the heat storage material units 16, 17.

With the automatic vending machine according to the present embodiment, it is possible to provide an automatic vending machine equipped with heat storage materials 180, without changing the external dimensions of the automatic vending machine, by disposing the heat storage material units 16, 17 in a position that is a dead space arising as a result of the product accommodating shelves 10 being disposed inclined with a prescribed gradient such that the rear sides thereof are lower than the front sides thereof. Further, providing the accommodating containers 160, 170 for accommodating the heat storage materials 180 makes it possible for the heat storage agent to be retained in the accommodating containers 160, 170 even if the heat storage agent leaks as a result of damage to the exterior covering material 181 that covers the heat storage agent, for example, thereby making it possible to prevent the heat storage agent adhering to the products.

A different embodiment of the present invention will next be described with reference to FIG. 18. FIG. 18 illustrates a heat storage material unit according to a different embodiment of the present invention, where (a) is a schematic cross-sectional view of a state in which the heat storage material unit has been attached to a heat-insulating panel, and (b) is an oblique view of the heat storage material unit.

In FIG. 18, reference number 100 represents a heat-insulating panel in which a recess 101 is formed, and reference number 200 represents a heat storage material unit. The heat storage material unit 200 comprises the heat storage material 180 and an accommodating container 210 which accommodates the heat storage material 180. The accommodating container 210 is made of a metal having a high thermal conductivity such as aluminum. It should be noted that the heat storage material 180 is the same as the heat storage material 180 in the embodiment discussed hereinabove, and has a flat plate-shape in which a heat storage agent having paraffin, which stores heat by changing physically or chemically, as a main component is covered by an exterior covering material 181 comprising a film that is formed in a plurality of layers by laminating. The accommodating container 210 has a recessed shape in cross section, and has a thin box shape with one surface (the "top surface" if the closed part of the recessed shape is the "bottom surface") open. Further, a flange 211 is formed around the open surface. It should be noted that the size of the recessed portion of the accommodating container 210 is formed to mate with the recess 101 formed in the heat-insulating panel 100. The heat storage material unit 200 is configured by accommodating the heat storage material 180 in the accommodating container 210. In this case, one surface of the flat plate-shaped heat storage material 180 is exposed from the open surface of the accommodating container 210, and the other surface of the heat storage material 180 is in close contact with the bottom surface of the accommodating container 210. It should be noted that in order to improve the stability of the state of accommodation of the heat storage material 180 in the accommodating container 210, adhesive tape retaining the heat storage material 180 is affixed across the top surface of the accommodating container 210.

The heat storage material unit 200 configured in this way is attached to the heat-insulating panel 100 by causing the accommodating container 210 to mate with the recess 101 formed in the heat-insulating panel 100. If the heat-insulating panel 100 defines a product accommodating compartment of the automatic vending machine, the in-compartment air flows past the one surface of the heat storage material 180 that is exposed inside the product accommodating compartment from the open surface of the accommodating container 210, while the other surface of the heat storage material 180 accommodated in the accommodating container 210 is also exposed inside the product accommodating compartment via the flange 211, with the accommodating container 210 serving as a heat transfer element, and is subjected to flow-past by the in-compartment air. Consequently, even if the heat storage material unit 200 is installed in such a way as to be embedded in the heat-insulating panel 100 in order to reduce the space required to install the heat storage material unit 200, the solidification (heat storage)/melting (heat dissipation) efficiency of the heat storage material 180 can be improved, and the quantity or volume of the heat storage material 180 can be reduced, compared with the conventional example illustrated in FIG. 19.

As described above, the heat storage material unit according to the different embodiment of the present invention has the advantage that the solidification (heat storage)/melting (heat dissipation) efficiency of the heat storage material 180 can be improved and the quantity or volume of the heat storage material 180 can be reduced, while reducing the space required to install the heat storage material unit 200.

As discussed hereinabove, according to the heat storage material unit 200, or the automatic vending machine equipped with the heat storage material unit 200, according to the present embodiment, the heat storage material unit 200 is formed by accommodating the heat storage material 180, which is covered by the exterior covering material 181, in the metal accommodating container 210 having a high thermal conductivity, and the heat storage material unit 200 is installed in the automatic vending machine by being embedded in the heat-insulating panel 100 in such a way that the accommodating container 210 is exposed inside the product accommodating compartment, thereby exposing the accommodating container 210 of the heat storage material unit 200 to the surrounding atmosphere (for example, the inside of the product accommodating compartment when applied to an automatic vending machine) even if the heat storage material unit 200 is installed in such a way as to be embedded in the heat-insulating panel 100 in order to reduce the space required to install the heat storage material unit 200, and thereby enabling the surface of the heat storage material 180 that is embedded in the heat-insulating panel 100 also to exhibit an action, with the accommodating container 210 serving as a heat transfer element, equivalent to that when exposed inside the product accommodating compartment, and having the advantage of improving the solidification (heat storage)/melting (heat dissipation) efficiency of the heat storage material 180.

Further, according to the automatic vending machine according to the present embodiment, the automatic vending machine is formed by disposing, in order from top to bottom in the product accommodating compartment of the main body cabinet 1 constructed as a heat-insulating housing, the product accommodating racks 4 in which the product accommodating shelves 10 defining the product accommodating passages 43 accommodating a plurality of products aligned lying down in a row in the front-rear direction are disposed in a plurality of levels in the vertical direction, the product dispensing chute 6 that is inclined downward toward the front, and the cooling/heating means 7 including the in-compartment lower fan F1 for cooling or heating the products accommodated in the product accommodating passages 43 to a temperature suitable for selling, wherein the product accommodating shelves 10 are inclined such that the rear sides thereof, serving as product dispensing ports 45, are lower than the front sides thereof, serving as product inlet ports 44, and the product dispensing devices 5 for separating and dispensing, one at a time, the products that have been accommodated lying down in the product accommodating passages 43 are provided in the vicinity of the product dispensing ports 45, and wherein the heat storage material units 16, 17 formed by accommodating the heat storage material 180 covered with the exterior covering material 181 in the metal accommodating containers 160, 170 having a high thermal conductivity are disposed above the uppermost product accommodating shelf 10 among the product accommodating shelves 10 that are in multiple levels in the vertical direction, in other words, disposed in a dead space arising as a result of the product accommodating shelves 10 being disposed inclined with a predetermined gradient in such a way that the rear sides thereof are lower than the front sides thereof, and thus the invention exhibits the advantage that the dead space can be effectively utilized, making it possible to provide an automatic vending machine equipped with the heat storage material 180, without changing the external dimensions of the automatic vending machine.

It should be noted that although in the abovementioned embodiment a description was given relating to an automatic vending machine having a product accommodating rack known as a slant rack, the automatic vending machine may also employ a product accommodating rack provided with a meandering product accommodating passage (also known as a serpentine rack), and the present invention is not limited to the abovementioned embodiment.

EXPLANATION OF THE REFERENCE NUMBERS

1 . . . main body cabinet, 4 . . . product accommodating rack, 5 . . . product dispensing device, 6 . . . product dispensing chute, 7 . . . cooling/heating unit (cooling/heating means), 10 . . . product accommodating shelf, 16, 17 . . . heat storage material unit, 160, 170, 210 . . . accommodating container, 180 . . . heat storage material, 181 . . . exterior covering material.

We claim:

1. An automatic vending machine for vending products at a suitable temperature, comprising:

a heat-insulating housing;

the heat-insulating housing comprising a plurality of heat-insulating panels;

a cooling/heating means including an in-compartment fan for cooling or heating; and a heat storage material unit;

wherein the heat storage material unit comprises a heat storage material in an accommodating container embedded in the heat-insulating panels; and wherein the heat storage material is exposed inside the heat-insulating housing.

2. The automatic vending machine as claimed in claim 1, characterized in that the accommodating container is made of aluminum.

3. The automatic vending machine as claimed in claim 1, characterized in that the accommodating container has a thin box shape with one open surface, and has a flange around the open surface.

4. The automatic vending machine as claimed in claim 1, characterized in that the heat storage material unit is disposed in such a way that an open surface of the accommodating container faces inward.

5. The automatic vending machine as claimed in claim 1, wherein the accommodating container comprises a high thermal conductivity metal.

6. The automatic vending machine as claimed in claim 1, wherein the heat-insulating housing comprises a product accommodating compartment.

7. The automatic vending machine as claimed in claim 6, wherein the product accommodating compartment comprises a product accommodating rack.

8. The automatic vending machine as claimed in claim 6, wherein the product accommodating compartment comprises a product dispensing chute.

* * * * *